(12) United States Patent
Fung et al.

(10) Patent No.: US 6,243,778 B1
(45) Date of Patent: Jun. 5, 2001

(54) TRANSACTION INTERFACE FOR A DATA COMMUNICATION SYSTEM

(75) Inventors: Anthony Fung, Pleasanton; Peter Groz, San Jose; Jim C. Hsu, Santa Clara; Danny K. Hui, Newark; Harry S. Hvostov, San Jose, all of CA (US)

(73) Assignee: STMicroelectronics, Inc., Carrollton, TX (US)

( * ) Notice: Subject to any disclaimer, the term of this patent is extended or adjusted under 35 U.S.C. 154(b) by 0 days.

(21) Appl. No.: 09/170,960

(22) Filed: Oct. 13, 1998

(51) Int. Cl.[7] ................ G06F 13/00; G06F 3/00
(52) U.S. Cl. ............ 710/113; 710/6; 710/109; 710/117; 710/128; 709/201; 709/227; 370/462; 370/528
(58) Field of Search .................. 710/113, 117, 710/128, 6, 109; 370/462, 528; 709/201, 227

(56) References Cited
U.S. PATENT DOCUMENTS

| | | | |
|---|---|---|---|
| 5,117,486 | * 5/1992 | Clark et al. .................. | 710/128 |
| 5,621,898 | * 4/1997 | Wooten ....................... | 710/117 |
| 5,751,723 | * 5/1998 | Heuvel et al. ................ | 370/528 |
| 5,812,784 | * 9/1998 | Watson et al. ............... | 709/227 |
| 6,052,580 | * 4/2000 | Khakoo ........................ | 455/418 |
| 6,092,098 | * 7/2000 | Araki et al. ................. | 709/201 |

* cited by examiner

Primary Examiner—Thomas Lee
Assistant Examiner—Tammara Peyton
(74) Attorney, Agent, or Firm—David V. Carlson; Theodore E. Galanthay; Lisa K. Jorgenson

(57) ABSTRACT

A system architecture for a high speed serial bus compatible with the 1394 standard is disclosed. A transaction interface coordinates data packets received from or sent to a 1394 bus. A kernel/scheduler/dispatcher is used to allocate memory resources, and start a variety of tasks and services. The tasks and services vary depending on protocols used in a transport layer and application layer used in conjunction with the 1394 layers. Each task operates according to a state machine progression. The transaction interface accepts data information from the tasks and forms data packets for delivery to the 1394 bus. The data packets are initially sent via an associated hardware register, but if busy, the transaction interface polls for other available registers. In addition, all queued transactions are loaded into registers in the most expedient manner.

24 Claims, 20 Drawing Sheets

1. MMC Block Data structure

| Byte Offset | 15 | 14 | 13 | 12 | 11 | 10 | 09 | 08 | 07 | 06 | 05 | 04 | 03 | 02 | 01 | 00 |
|---|---|---|---|---|---|---|---|---|---|---|---|---|---|---|---|---|
| 00 | tl ||||||| spd ||| timer_ID |||||
| 02 | source_ID ||||||||||||||||
| 04 | mgmt_ORB_addr (hi) ||||||||||||||||
| 06 | mgmt_ORB_addr (mid) ||||||||||||||||
| 08 | mgmt_ORB_addr (lo) ||||||||||||||||
| 10 | task_state |||||||| next_task_state ||||||||
| 12–42 | Management ORB or Task ORB (32 bytes) ||||||||||||||||
| 44 | next_MMC_Blk_pointer ||||||||||||||||

Descriptions of each field:

| | |
|---|---|
| tl | Transaction label |
| spd | Speed to communicate with the initiator |
| timer_ID | The timer allocated for this management ORB |
| source_ID | Initiator node ID |
| mgmt_ORB_addr | Address of the management ORB address |
| task_state | Internal state of the Management Agent Task |
| next_task_state | The next task_state to transition to |
| Management ORB or Task ORB | The 32 byte ORB content from the initiator |
| next_MMC_Blk_pointer | Pointer to the next MMC Block |

*FIG. 4*

TMC BLOCK DATA STRUCTURE

| Word Offset | 15 | 14 | 13 | 12 | 11 | 10 | 09 | 08 | 07 | 06 | 05 | 04 | 03 | 02 | 01 | 00 |
|---|---|---|---|---|---|---|---|---|---|---|---|---|---|---|---|---|
| 00 | task_ID ||||||||| grp | conf | abrt | dta | transaction_count ||||
| 01 | login_ID ||||||||||||||||
| 02 | reserved |||||| retry_count ||| reserved |||| speed ||||
| 03 | max_data_transfer_length ||||||||||||||||
| 04 | destination_ID ||||||||||||||||
| 05 | transaction_label ||||| reserved ||| transaction_code |||| priority ||||
| 06–30 | packet dependent information ||||||||||||||||

FIG. 5A

Write Request for Data Block Packet with dta bit field set to zero
Read Request for Data Block Packet

| Word Offset | 15 | 14 | 13 | 12 | 11 | 10 | 09 | 08 | 07 | 06 | 05 | 04 | 03 | 02 | 01 | 00 |
|---|---|---|---|---|---|---|---|---|---|---|---|---|---|---|---|---|
| 06 | most significant word of destination_offset ||||||||||||||||
| 07 | middle word of destination_offset ||||||||||||||||
| 08 | least significant word of destination_offset ||||||||||||||||
| 09 | data_length ||||||||||||||||
| 10 | extended_tcode ||||||||||||||||
| 11 | payload buffer starting address (hi) ||||||||||||||||
| 12 | payload buffer starting address (lo) ||||||||||||||||
| 13 | total payload transfer byte count (hi) ||||||||||||||||
| 14 | total payload transfer byte count (lo) ||||||||||||||||
| 15 | reserved ||||||||||||||||
| 16 | reserved ||||||||||||||||
| 17 | reserved ||||||||||||||||
| 18 | reserved ||||||||||||||||
| ⋮ | ⋮ ||||||||||||||||
| 29 | reserved ||||||||||||||||
| 30 | reserved ||||||||||||||||

FIG. 5B  312

Write Request for Data Block Packet with dta bit field set to one

| Word Offset | 15 | 14 | 13 | 12 | 11 | 10 | 09 | 08 | 07 | 06 | 05 | 04 | 03 | 02 | 01 | 00 |
|---|---|---|---|---|---|---|---|---|---|---|---|---|---|---|---|---|
| 06 | most significant word of destination_offset ||||||||||||||||
| 07 | middle word of destination_offset ||||||||||||||||
| 08 | least significant word of destination_offset ||||||||||||||||
| 09 | data_length ||||||||||||||||
| 10 | extended_tcode ||||||||||||||||
| 11 | payload buffer starting address (hi)-calculated by Transaction Interface ||||||||||||||||
| 12 | payload buffer starting address (lo)-calculated by Transaction Interface ||||||||||||||||
| 13 | total payload transfer byte count (hi) ||||||||||||||||
| 14 | total payload transfer byte count (lo) ||||||||||||||||
| 15 | data word 0 ||||||||||||||||
| 16 | data word 1 ||||||||||||||||
| 17 | data word 2 ||||||||||||||||
| 18 | data word 3 ||||||||||||||||
| ⋮ | ⋮ ||||||||||||||||
| 29 | data word 14 ||||||||||||||||
| 30 | data word 15 ||||||||||||||||

FIG. 5C  314

Write Request for Data Quadlet Packet

| Word Offset | 15 | 14 | 13 | 12 | 11 | 10 | 09 | 08 | 07 | 06 | 05 | 04 | 03 | 02 | 01 | 00 |
|---|---|---|---|---|---|---|---|---|---|---|---|---|---|---|---|---|
| 06 | most significant word of destination_offset ||||||||||||||||
| 07 | middle word of destination_offset ||||||||||||||||
| 08 | least significant word of destination_offset ||||||||||||||||
| 09 | first word of quadlet data ||||||||||||||||
| 10 | second word of quadlet data ||||||||||||||||
| 11 | reserved ||||||||||||||||
| 12 | reserved ||||||||||||||||
| 13 | reserved ||||||||||||||||
| 14 | reserved ||||||||||||||||
| 15 | reserved ||||||||||||||||
| 16 | reserved ||||||||||||||||
| 17 | reserved ||||||||||||||||
| 18 | reserved ||||||||||||||||
| ⋮ | ⋮ ||||||||||||||||
| 29 | reserved ||||||||||||||||
| 30 | reserved ||||||||||||||||

*FIG. 5D*  316

Write Response Packet

| Word Offset | 15 | 14 | 13 | 12 | 11 | 10 | 09 | 08 | 07 | 06 | 05 | 04 | 03 | 02 | 01 | 00 |
|---|---|---|---|---|---|---|---|---|---|---|---|---|---|---|---|---|
| 06 | rcode |||| reserved ||||||||||||
| 07 | reserved ||||||||||||||||
| 08 | reserved ||||||||||||||||
| 09 | reserved ||||||||||||||||
| 10 | reserved ||||||||||||||||
| 11 | reserved ||||||||||||||||
| 12 | reserved ||||||||||||||||
| 13 | reserved ||||||||||||||||
| 14 | reserved ||||||||||||||||
| 15 | reserved ||||||||||||||||
| 16 | reserved ||||||||||||||||
| 17 | reserved ||||||||||||||||
| 18 | reserved ||||||||||||||||
| ⋮ | ⋮ ||||||||||||||||
| 29 | reserved ||||||||||||||||
| 30 | reserved ||||||||||||||||

*FIG. 5E*  318

Read Request for Data Quadlet Packet

| Word Offset | 15 | 14 | 13 | 12 | 11 | 10 | 09 | 08 | 07 | 06 | 05 | 04 | 03 | 02 | 01 | 00 |
|---|---|---|---|---|---|---|---|---|---|---|---|---|---|---|---|---|
| 06 | most significant word of destination_offset ||||||||||||||||
| 07 | middle word of destination_offset ||||||||||||||||
| 08 | least significant word of destination_offset ||||||||||||||||
| 09 | reserved ||||||||||||||||
| 10 | reserved ||||||||||||||||
| 11 | reserved ||||||||||||||||
| 12 | reserved ||||||||||||||||
| 13 | reserved ||||||||||||||||
| 14 | reserved ||||||||||||||||
| 15 | reserved ||||||||||||||||
| 16 | reserved ||||||||||||||||
| 17 | reserved ||||||||||||||||
| 18 | reserved ||||||||||||||||
| ⋮ | ⋮ ||||||||||||||||
| 29 | reserved ||||||||||||||||
| 30 | reserved ||||||||||||||||

*FIG. 5F*  320

Read Response for Data Block Packet

| Word Offset | 15 | 14 | 13 | 12 | 11 | 10 | 09 | 08 | 07 | 06 | 05 | 04 | 03 | 02 | 01 | 00 |
|---|---|---|---|---|---|---|---|---|---|---|---|---|---|---|---|---|
| 06 | rcode |||| reserved ||||||||||||
| 07 | reserved ||||||||||||||||
| 08 | reserved ||||||||||||||||
| 09 | data_length ||||||||||||||||
| 10 | extended_tcode ||||||||||||||||
| 11 | payload buffer starting address (hi) ||||||||||||||||
| 12 | payload buffer starting address (lo) ||||||||||||||||
| 13 | total payload transfer byte count (hi) ||||||||||||||||
| 14 | total payload transfer byte count (lo) ||||||||||||||||
| 15 | reserved ||||||||||||||||
| 16 | reserved ||||||||||||||||
| 17 | reserved ||||||||||||||||
| 18 | reserved ||||||||||||||||
| ⋮ | ⋮ ||||||||||||||||
| 29 | reserved ||||||||||||||||
| 30 | reserved ||||||||||||||||

*FIG. 5G*  322

Read Response for Data Quadlet Packet

| Word Offset | 15 | 14 | 13 | 12 | 11 | 10 | 09 | 08 | 07 | 06 | 05 | 04 | 03 | 02 | 01 | 00 |
|---|---|---|---|---|---|---|---|---|---|---|---|---|---|---|---|---|
| 06 | rcode | | | | reserved | | | | | | | | | | | |
| 07 | reserved | | | | | | | | | | | | | | | |
| 08 | reserved | | | | | | | | | | | | | | | |
| 09 | first word of quadlet data | | | | | | | | | | | | | | | |
| 10 | second word of quadlet data | | | | | | | | | | | | | | | |
| 11 | reserved | | | | | | | | | | | | | | | |
| 12 | reserved | | | | | | | | | | | | | | | |
| 13 | reserved | | | | | | | | | | | | | | | |
| 14 | reserved | | | | | | | | | | | | | | | |
| 15 | reserved | | | | | | | | | | | | | | | |
| 16 | reserved | | | | | | | | | | | | | | | |
| 17 | reserved | | | | | | | | | | | | | | | |
| 18 | reserved | | | | | | | | | | | | | | | |
| ⋮ | ⋮ | | | | | | | | | | | | | | | |
| 29 | reserved | | | | | | | | | | | | | | | |
| 30 | reserved | | | | | | | | | | | | | | | |

*FIG. 5H*  324

Lock Response Packet

| Word Offset | 15 | 14 | 13 | 12 | 11 | 10 | 09 | 08 | 07 | 06 | 05 | 04 | 03 | 02 | 01 | 00 |
|---|---|---|---|---|---|---|---|---|---|---|---|---|---|---|---|---|
| 06 | rcode | | | | reserved | | | | | | | | | | | |
| 07 | reserved | | | | | | | | | | | | | | | |
| 08 | reserved | | | | | | | | | | | | | | | |
| 09 | data_length | | | | | | | | | | | | | | | |
| 10 | extended_tcode | | | | | | | | | | | | | | | |
| 11 | first word of old_value | | | | | | | | | | | | | | | |
| 12 | second word of old value | | | | | | | | | | | | | | | |
| 13 | third word of old value | | | | | | | | | | | | | | | |
| 14 | fourth word of old value | | | | | | | | | | | | | | | |
| 15 | reserved | | | | | | | | | | | | | | | |
| 16 | reserved | | | | | | | | | | | | | | | |
| 17 | reserved | | | | | | | | | | | | | | | |
| 18 | reserved | | | | | | | | | | | | | | | |
| ⋮ | ⋮ | | | | | | | | | | | | | | | |
| 29 | reserved | | | | | | | | | | | | | | | |
| 30 | reserved | | | | | | | | | | | | | | | |

| Current State | Function | Event | WAIT_FOR_ORB_WRT_RESP | WAIT_FOR_TMC_RESOURCE | MGMT_AGENT_WRITE | (done) | WAIT_FOR_ORB_FETCH | WAIT_FOR_TMC_RESOURCE | MGMT_AGENT_WRITE | (done) | MGMT_AGENT_WRITE | (done) | WAIT_FOR_LOGIN_EUI | WAIT_FOR_TMC_RESOURCE | MGMT_AGENT_WRITE | (done) | QUERY_LOGINS_RESPONSE_SENT | WAIT_FOR_TMC_RESOURCE | WAIT_FOR_SET_PASSWORD | WAIT_FOR_TMC_RESOURCE | MGMT_AGENT_WRITE | MGMT_AGENT_WRITE | (done) | (done) |
|---|---|---|---|---|---|---|---|---|---|---|---|---|---|---|---|---|---|---|---|---|---|---|---|---|
| MGMT_AGENT_WRITE | | Transaction confirmation req | | | | | | | | | | | | | | | | | | | | | | |
| | | No transaction confirmation req | | | | | | | | | | | | | | | | | | | | | | |
| | | Reconnect: read EUI-64 | | | | | | | | | | | | | | | | | | | | | | |
| | set password | Set password: read pwd req | | | | | | | | | | | | | | | | | X | | | | | |
| | query-logins | Query Logins: query resp sent | | | | | | | | | | | | | | | X | | | | | | | |
| | login | Login func: read pwd request | | | | | | | | | | | | | | | | | | | | | | |
| | | Login func: login respe sent | | | | | | | | | | | | | | | | | | | | | | |
| | | Login func: read EUI-64 | | | | | | | | | | | X | | | | | | | | | | | |
| | | ORB func completed without err | | | | | | | | | | | | | | | | | | | X | X | | |
| | | ORB func completed with error | | | | | | | | | | | | X | X | | | | | | X | X | | |
| | | No free UMC Block | | | | | | | | | | | | | | | | | | | | | | |
| WAIT_FOR_ORB_WRT_RESP | | No free TMC Block | X | | | X | | | | | X | | | X | | | | X | | | | | | |
| | | Fetch management ORB | | | X | | | | | | | | | | | | | | | | | | | |
| | | Transaction compl with error | | | | | | X | X | X | X | | | | | | | | | | | | | |
| | | No MMC Block in queue | | X | | | | X | | X | | | | | X | | | | | | | X | X | |
| WAIT_FOR_ORB_FETCH | | Next MMC Block available | | X | | | X | X | | | | | X | | | | | | | | X | X | | |
| | | Split transaction time out | X | X | | | | | | | | | | | | | | | | | | | | |
| | | Send ORB write response | X | | | | | | | | | | | | | | | | | | | | | |

FIG. 15B

| CURRENT STATE | Function | Transaction confirmation req | No transaction confirmation req | Reconnect: read EUI-64 | Set password: read pwd req | Query Logins: query resp sent | Login func: read pwd request | Login func: login respe sent | Login func: read EUI-64 | ORB func completed without err | ORB func completed with error | No free UMC Block | No free TMC Block | Fetch management ORB | Transaction compl with error | No MMC Block in queue | Next MMC Block available | Split transaction time out | Send ORB write response | NEXT STATE |
|---|---|---|---|---|---|---|---|---|---|---|---|---|---|---|---|---|---|---|---|---|
| WAIT_FOR_ORB_FETCH | logout | | | | | | | | | X | | | X | | | | X | | | WAIT_FOR_TMC_RESOURCE |
| | logout | | | | | | | | | X | | | | | | X | | | | MGMT_AGENT_WRITE |
| | logout | | | | | | | | | | | | | | | | | | | (done) |
| | reconnect | | | X | | | | | | | | | X | | | | X | | | WAIT_FOR_RECONNECT_EUI |
| | reconnect | | | | | | | | | | X | | | | | | | | | WAIT_FOR_TMC_RESOURCE |
| | reconnect | | | | | | | | | | | | | | | X | | | | MGMT_AGENT_WRITE |
| | reconnect | | | | | | | | | | | | | | | | | | | (done) |
| | terminate | | | | | | | | | X | | | X | | | | X | | | WAIT_FOR_TMC_RESOURCE |
| | terminate | | | | | | | | | X | | | | | | X | X | | | MGMT_AGENT_WRITE |
| | terminate | | | | | | | | | | X | | | | | | | | | (done) |
| | abort task | | | | | | | | | X | | | X | | | | X | | | WAIT_FOR_TMC_RESOURCE |
| | abort task | | | | | | | | | X | | | | | | X | X | | | MGMT_AGENT_WRITE |
| | abort task | | | | | | | | | | X | | | | | X | | | | MGMT_AGENT_WRITE |
| | abort task | | | | | | | | | | X | | | | | | | | | (done) |
| | abort task set | | | | | | | | | X | | | X | | | | X | | | WAIT_FOR_TMC_RESOURCE |
| | abort task set | | | | | | | | | X | | | | | | X | X | | | MGMT_AGENT_WRITE |
| | abort task set | | | | | | | | | | X | | | | | X | | | | MGMT_AGENT_WRITE |
| | abort task set | | | | | | | | | | X | | | | | | | | | (done) |
| | abort task set | | | | | | | | | | X | | | | | X | | | | (done) |

550

| CURRENT STATE | Function | NEXT STATE | | | | | | | | | | | | | | |
|---|---|---|---|---|---|---|---|---|---|---|---|---|---|---|---|---|
| | | WAIT_FOR_TMC_RESOURCE | WAIT_FOR_CTS_UMC | MGMT_AGENT_WRITE | MGMT_AGENT_WRITE | (done) | (done) | WAIT_FOR_TMC_RESOURCE | WAIT_FOR_LUR_UMC | MGMT_AGENT_WRITE | MGMT_AGENT_WRITE | (done) | (done) | WAIT_FOR_TMC_RESOURCE | WAIT_FOR_TR_UMC | MGMT_AGENT_WRITE | MGMT_AGENT_WRITE | (done) | (done) |
| | Transaction confirmation req | | | | | | | | | | | | | | | | | | |
| | No transaction confirmation req | | | | | | | | | | | | | | | | | | |
| | Reconnect: read EUI-64 | | | | | | | | | | | | | | | | | | |
| | Set password: read pwd req | | | | | | | | | | | | | | | | | | |
| | Query Logins: query resp sent | | | | | | | | | | | | | | | | | | |
| | Login func: read pwd request | | | | | | | | | | | | | | | | | | |
| | Login func: login respe sent | | | | | | | | | | | | | | | | | | |
| | Login func: read EUI-64 | | | | | | | | | | | | | | | | | | |
| WAIT_FOR_ORB_FETCH | ORB func completed without err | | x | | x | | | | x | | x | | | | x | | x | | |
| | ORB func completed with error | | | x | | x | | | | x | | x | | | | x | | x |
| | No free UMC Block | x | | | | | | x | | | | | | x | | | | | |
| | No free TMC Block | x | | | | | | x | | | | | | x | | | | | |
| | Fetch management ORB | | | | | | | | | | | | | | | | | | |
| | Transaction compl with error | | | | | | | | | | | | | | | | | | |
| | No MMC Block in queue | | | x | x | | | | | x | x | | | | | x | x | | |
| | Next MMC Block available | | x | x | | | | | x | x | | | | | x | x | | | |
| | Split transaction time out | | | | | | | | | | | | | | | | | | |
| | Send ORB write response | | | | | | | | | | | | | | | | | | |
| | | clear task set | | | logical unit reset | | | target reset | | | | | | | | | | | |

FIG. 15D — 550

| Function / Current State | LOGIN_RESPONSE_SENT | WAIT_FOR_LOGIN_PASSWORD | WAIT_FOR_TMC_RESOURCE | MGMT_AGENT_WRITE | (done) | WAIT_FOR_TMC_RESOURCE | MGMT_AGENT_WRITE | (done) | LOGIN_RESPONSE_SENT | WAIT_FOR_TMC_RESOURCE | MGMT_AGENT_WRITE | (done) | WAIT_FOR_TMC_RESOURCE | MGMT_AGENT_WRITE | (done) | WAIT_FOR_TMC_RESOURCE | MGMT_AGENT_WRITE | (done) | WAIT_FOR_TMC_RESOURCE | MGMT_AGENT_WRITE | (done) | WAIT_FOR_CTS_UMC |
|---|---|---|---|---|---|---|---|---|---|---|---|---|---|---|---|---|---|---|---|---|---|---|
| Transaction confirmation req | | | | | | | | | | | | | | | | | | | | | | |
| No transaction confirmation req | | | | | | | | | | | | | | | | | | | | | | |
| Reconnect: read EUI-64 | | | | | | | | | | | | | | | | | | | | | | |
| Set password: read pwd req | | | | | | | | | | | | | | | | | | | | | | |
| Query Logins: query resp sent | | | | | | | | | | | | | | | | | | | | | | |
| Login func: read pwd request | | X | | | | | | | | | | | | | | | | | | | | |
| Login func: login respe sent | X | | | | | | | | X | | | | | | | | | | | | | |
| Login func: read EUI-64 | | | | | | | | | | | | | | | | | | | | | | |
| ORB func completed without err | | | | X | X | | X | X | | X | X | | X | X | | X | X | | X | X | | |
| ORB func completed with error | | X | X | | | | | | | | | | | | | | | | | | | |
| No free UMC Block | | | | | | | | | | | | | | | | | | | | | | X |
| No free TMC Block | | X | | X | | X | | | | X | | | X | | | X | | | X | | | |
| Fetch management ORB | | | | | | | | | | | | | | | | | | | | | | |
| Transaction compl with error | | | | | | | | | | | | | | | | | | | | | | |
| No MMC Block in queue | | | | X | | X | | | | X | | | X | | | X | | | X | | | |
| Next MMC Block available | | X | | X | | X | | | | X | | | X | | | X | | | X | | | |
| Split transaction time out | | | | | | | | | | | | | | | | | | | | | | |
| Send ORB write response | | | | | | | | | | | | | | | | | | | | | | |
| Current State | | | | | | | | | | | | | | | | | | | | | | |
| WAIT_FOR_LOGIN_EUI | | | | | | | | | | | | | | | | | | | | | | |
| LOGIN_RESPONSE_SENT | | | | | | | | | | | | | | | | | | | | | | |
| WAIT_FOR_LOGIN_PASSWORD | | | | | | | | | | | | | | | | | | | | | | |
| QUERY_LOGINS_RESPONSE_SENT | | | | | | | | | | | | | | | | | | | | | | |
| WAIT_FOR_SET_PASSWORD | | | | | | | | | | | | | | | | | | | | | | |
| WAIT_FOR_RECONNECT_EUI | | | | | | | | | | | | | | | | | | | | | | |
| WAIT_FOR_CTS_UMC | | | | | | | | | | | | | | | | | | | | | | |

FIG. 15E ~550

| CURRENT STATE | Function | NEXT STATE: WAIT_FOR_TMC_RESOURCE | MGMT_AGENT_WRITE (done) | WAIT_FOR_LUR_UMC | WAIT_FOR_TMC_RESOURCE | MGMT_AGENT_WRITE (done) | WAIT_FOR_TR_UMC | WAIT_FOR_TMC_RESOURCE | MGMT_AGENT_WRITE (done) | WAIT_FOR_TMC_RESOURCE | MGMT_AGENT_WRITE (done) | WAIT_FOR_ORB_WRT_RESP | WAIT_FOR_ORB_FETCH | WAIT_FOR_LOGIN_EUI | LOGIN_RESPONSE_SENT | WAIT_FOR_LOGIN_PASSWORD | QUERY_LOGINS_RESPONSE_SENT | WAIT_FOR_SET_PASSWORD | WAIT_FOR_RECONNECT_EUI |
|---|---|---|---|---|---|---|---|---|---|---|---|---|---|---|---|---|---|---|---|
| | Transaction confirmation req | | | | | | | | | | | X | X | X | X | X | X | X | X |
| | No transaction confirmation req | | | | | | | | | | | X | X | | | | | | |
| | Reconnect: read EUI-64 | | | | | | | | | | | | | | | | | | |
| | Set password: read pwd req | | | | | | | | | | | | | | | | | | |
| | Query Logins: query resp sent | | | | | | | | | | | | | | | | | | |
| | Login func: read pwd request | | | | | | | | | | | | | | | | | | |
| | Login func: login respe sent | | | | | | | | | | | | | | | | | | |
| | Login func: read EUI-64 | | | | | | | | | | | | | | | | | | |
| WAIT_FOR_LUR_UMC | ORB func completed without err | | X | X | | X | X | | X | X | | | | | | | | | |
| | ORB func completed with error | | | | | | | | | | | | | | | | | | |
| | No free UMC Block | | | | X | | | X | | | | | | | | | | | |
| | No free TMC Block | X | | | X | | | X | | X | | | | | | | | | |
| WAIT_FOR_TR_UMC | Fetch management ORB | | | | | | | | | | | | | | | | | | |
| | Transaction compl with error | | | | | | | | | | | | | | | | | | |
| | No MMC Block in queue | | X | | | X | | | X | | X | | | | | | | | |
| WAIT_FOR_TMC_RESOURCE | Next MMC Block available | | X | | | X | | | X | | X | | | | | | | | |
| | Split transaction time out | | | | | | | | | | | | | | | | | | |
| | Send ORB write response | | | | | | | | | | | | | | | | | | |

TRANSACTION INTERFACE FOR A DATA COMMUNICATION SYSTEM

TECHNICAL FIELD

This invention relates to communication between devices connected to a data communication system. More specifically, this invention relates to a transaction interface that receives data from tasks and services in a node coupled to a high speed serial bus and places the data on the high-speed serial bus. Additionally it receives data packets from the bus and formats them for use within the node on which the transaction interface sits.

BACKGROUND OF THE INVENTION

In general, there are two types of data buses: serial and parallel. A parallel bus is typically measured in capacity and speed. Parallel bus width capacity is measured in bytes and speed is usually measured in MHz or bytes/second. For example, the popular Peripheral Component Interconnect (PCI) bus is a parallel bus 32 bits wide and operating up to 33 MHz. At this frequency it can carry data at a rate of over 1 Gigabit per second (1 Gbps). A defining feature of a parallel bus is that all of the bits in its width are sent simultaneously, for instance, in the PCI bus, all 32 bits are sent at the same time during a cycle. This requires at least as many signal lines in the bus as its width, and additional lines for addressing, power, and other signals. The PCI bus has nearly 50 signal lines. Signal lines are usually embodied as traces on a printed circuit board or wires. The large number of signal lines in a parallel bus makes it expensive to implement. Additionally, the number of devices on a PCI bus is limited and each device requires a card and an open corresponding card slot to plug into the bus.

A serial bus, conversely, transfers data one bit at a time. Although this reduces the number of lines needed for the serial bus, it greatly extends the time needed to transmit data as compared to a parallel bus. For instance, if operating at the same frequency, a serial bus transmits only one bit of data in the same time a PCI bus transmits 32 bits. An example of a serial bus is the Universal Serial Bus (USB). This bus contains 4 wires, and has a maximum data rate of 12 Megabits per second (Mbps). The low number of wires makes a serial bus ideal for interconnecting devices via a cable, as the cable can be manufactured inexpensively. However, because data intensive applications require a high volume of data to be quickly moved, manufacturers have generally relied on parallel, rather than serial buses for interconnecting data-intensive devices. Applications using such data-intensive devices include video and audio reproduction, and high-speed storage mechanisms such as hard disk drives, among others.

Until now, designers of systems that move data over a bus had to choose between the fast and expensive parallel bus, or the slow and inexpensive serial bus. Recently, specifications for a high-speed serial bus were adopted by the Institute of Electrical and Electronics Engineers. The specification, IEEE 1394-1995, is one of several protocol standards known as "FireWire", or simply, 1394. The 1394 specification includes standards for data transfer rates of up to 400 Mbps using only 2 pairs of data wires and 1 pair of wires for power. This data rate is fast enough to accommodate the data intensive needs of video, audio and high speed storage. Future needs will be met by another proposed 1394 standard having a data rate over 1 Gbps. Therefore, by using a 1394 standard bus, data intensive tasks can be inexpensively implemented on a serial bus without the drawbacks of using a parallel bus.

The 1394 bus uses a peer-to-peer architecture. Physical and logical nodes attach to the 1394 bus by means of a six-conductor cable. Up to 63 nodes can be connected on each independent bus bridge, and 1,023 bridges are allowed in the system, for a total of over 65,000 devices on one 1394 system. It is likely that a 1394-to-PCI interface, possibly using the Open Host Controller Interface (OHCI) standard, will be used when using a 1394 bus in a computer. However, strictly speaking, the 1394 bus can operate independently from a computer by coupling related devices together via the connection cable. In addition to a cable specification, a backplane specification is provided for the 1394 bus. The backplane specification will most likely be used for a bus within a computer or some other wholly-contained system. The transaction interface described herein operates in either the cable or backplane environment.

The 1394 standard specifies three "layers," physical, link, and transaction. The physical layer transmits electrical signals along the serial bus, arbitrates the bus by ensuring that only one node is sending data at a time, and translates electrical signals sensed from the bus into data signals for the link layer. The link layer assembles the data signals retrieved from the bus into data packets, and provides services such as addressing, data checking, and generating a "cycle" signal used for timing and synchronization. The transaction layer accepts the data packets from the link layer and includes bus transactions required to support a command and status register (CSR) architecture, including read, write, and lock. Several other buses use the CSR standard and specifying that 1394 must also conform to the CSR standard makes it easy to adapt or connect a 1394 bus to these other buses. Generally, the physical and link layers, as well as a limited number of transaction functions appear in hardware. The remainder of the transaction layer functions are performed in software.

To be useful, additional communication layers must communicate with and operate above the 1394 layers. For instance, directly above the transaction layer is a transport layer, using for example, Serial Bus Protocol-2 (SBP-2) or the standard IEC 61883 FCP/CMP, referred to as Functional Control Protocol (FCP). These standards define a protocol for the transport of commands and data over high performance serial buses. Additionally, above the transport layer is an application layer using such protocol standards as Reduced Block Commands (RBC), Printer Working Group (PWG), or Internet Protocol (IP). The interaction of these layers with each other and with the layers of the 1394 specification are further described herein.

It is thus desirable to have a transaction interface that helps each node perform all of the duties outlined in the 1394 specification in an expedient manner. It is also desirable for the transaction interface to route data sent to it in the most expedient manner.

SUMMARY OF THE INVENTION

In a data communication system, for instance a 1394 bus system, a transaction interface operates at a logical node on the bus. As packets are sent along the bus directed towards the specific node on which the transaction interface sits, the transaction interface decodes the packet contents into control blocks for further operation. The further operation can include execution by an application also operating at the local node. Additionally, the application may require data to be transmitted to another node on the bus. In this case, the application communicates with the transaction interface via message control blocks, which are then converted into data signals and placed on the bus to be received at the destination node.

In accordance with one aspect of the present invention, a transaction interface that is coupled to a high speed serial bus is provided. The transaction interface is coupled to transaction hardware that attaches to the serial bus. The transaction interface includes a queue that accepts message control blocks, which contain organized data, a conversion engine that reads the message control blocks and converts them into data packets, and an output port that passes the data packets to the transmit bay, to be placed on the bus.

In other embodiments of the invention, multiple registers are provided in the hardware and the transaction interface polls for an open register in order to send the data in the most expedient manner.

In another aspect of the present invention, a method of transacting data to a serial bus is provided. The method includes steps of accepting data destined for the bus, formatting the data to be sent into one or more packets, formatting other data contained within the message control block into packet headers for the packets, and writing the packets and the packet headers to a hardware interface to the serial bus.

In still another embodiment of the invention, writing the packets and the packet headers to a hardware interface includes evaluating a data structure to determine if any of the hardware registers are currently available, and if not, sequentially evaluating all of the hardware registers, in sequence, until a hardware register that does not have data in it is found.

BRIEF DESCRIPTION OF THE DRAWINGS

FIG. 4 is a chart showing a message control block structure.

FIGS. 5A–5I are charts showing a message control block for the transaction interface and specific data structures for the message control block depending on what action is being taken.

FIGS. 15A–15E are charts showing the states of the Management Agent Task

DETAILED DESCRIPTION OF THE INVENTION

Figure 1:
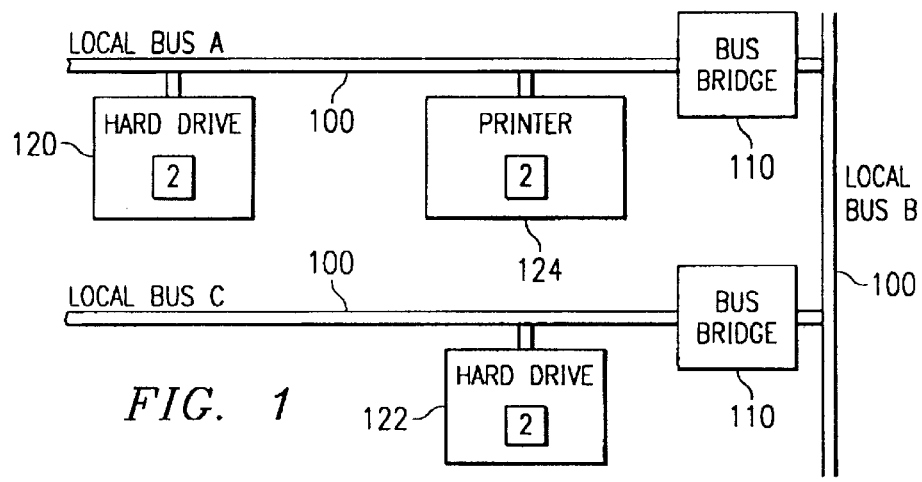
FIG. 1 is a diagram showing a possible 1394 bus configuration.

FIG. 1 shows one method of implementing a 1394 bus architecture. A bus 100 is subdivided into three local buses, A, B, and C. Both the local bus A and local bus C use a bus bridge 110 to connect to the local bus B. Devices sit as nodes on the local buses. A layer structure 2, described below, is contained within all of the nodes on the bus. The devices can be any device used to generate, accept, or transmit data, such as a first hard disk drive 120, a second hard disk drive 122, or a printer 124. Each local bus can have a maximum of 63 nodes, however, by using bus bridges, a 1394 bus system can have over 65,000 nodes. Typically data traffic is limited to a local bus so that, for example, devices on the local bus C cannot see data passed on local bus A. This increases bandwidth of the bus system by only passing data on a local bus that is directed to that local bus. The bus bridge 110 monitors bus traffic on the local bus to which it is attached looking for data intended for a node on another local bus. If such data is sensed, the bus bridge 110 forwards the data to the desired bus. Therefore, the printer 124 on the local bus A can receive data from either the hard disk drive 120 (on local bus A) or from the hard disk drive 122 through the local bus bridge 110 (on local bus B). Additionally, the bus bridge 110 could couple the 1394 bus to a bus typically used in a computer, such as a PCI bus (not shown).

Figure 2:
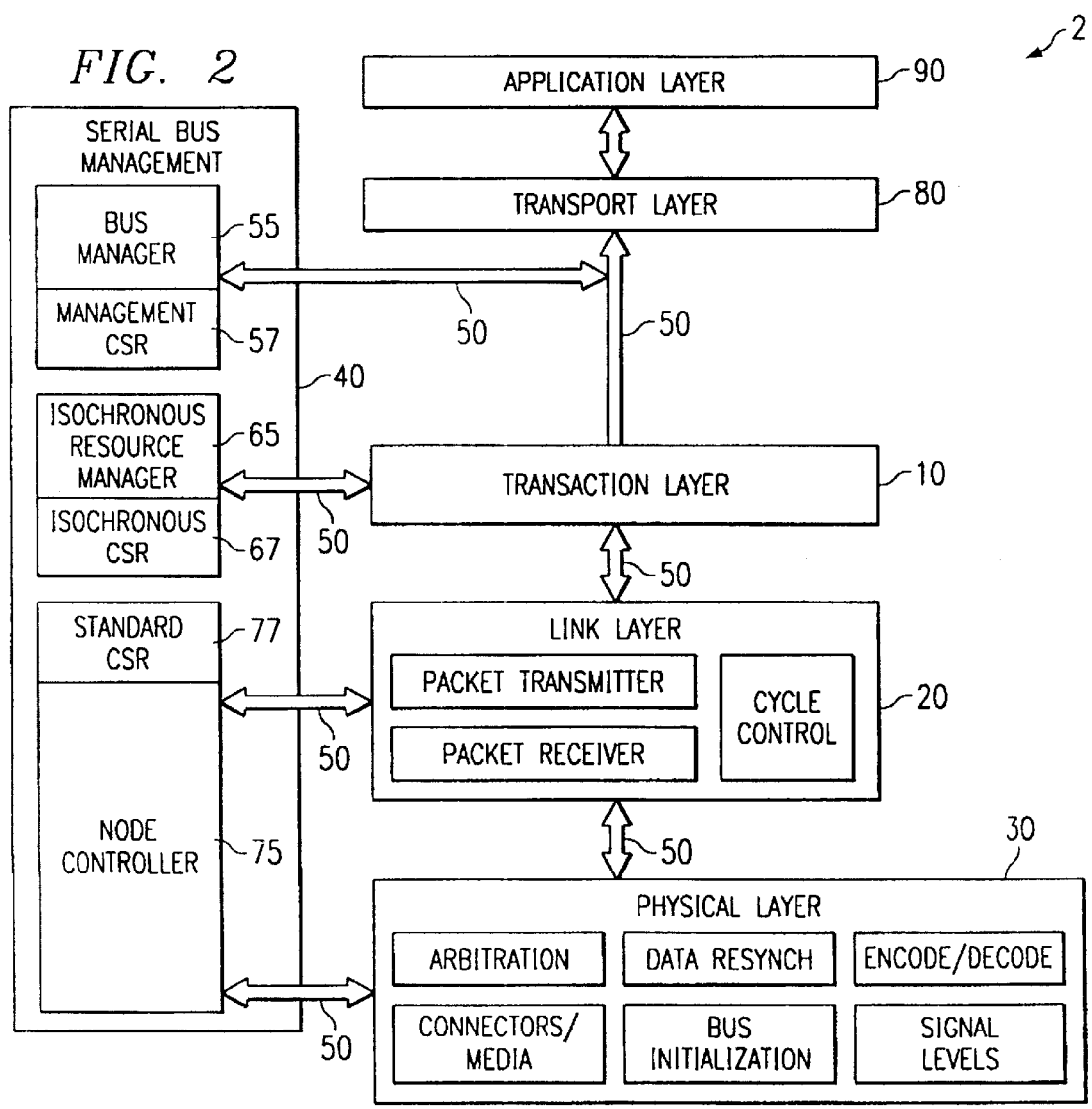
FIG. 2 is a diagram showing layers of the 1394 standard as well as layers that interact with the layers of the 1394 standard.

FIG. 2 shows a general overview of the layer structure 2 of 1394, including serial bus management. This layer structure appears in every node attached to a local 1394 bus. The layer structure 2 includes a transaction layer 10, a link layer 20, a physical layer 30, and serial bus management 40. In conjunction with the 1394 layers, a transport layer 80 and an application layer 90 are also used, as described above. Communication between the layers 10, 20, 30 and serial bus management 40 as well as with the layers 80 and 90 is through bi-directional inter-layer communication 50, which can include more than one communication path. Communication 50 need not be a data bus, but may be any of a number of communication methods, such as signal wires, shared memory resources, or other means. As shown in FIG. 2, the transaction layer 10 directly communicates with the link layer 20, a bus manager 55 and passes isochronous signals to an isochronous resource manager 65 contained within the serial bus management 40.

Layers in a communication system, such as the 1394 bus are situated to work independent from but in conjunction with layers around them. Generally, the farther a layer is from the hardware, such as the data wires of a 1394 bus, the higher order it is. Higher order layers can perform higher order functions. For instance, the transaction layer 10 of the 1394 specification performs only read, write and lock functions. A transport layer 80 communicates with the transaction layer 10 and has higher order commands. The particular transport layer standard used determines its commands. For examples, in the SBP-2 transport layer, commands such as login, reconnect, and set password, for example, are available. Above the transport layer 80 is an application layer 90, that uses protocols such as RBC, PWG, or IP. The application layer 90 works in conjunction with software to perform the desired application.

The 1394 specification includes two basic data transfer services, isochronous data transfer and asynchronous data transfer. The isochronous data transfer specification provides for packets to be sent along the high-speed serial bus at regular intervals. Typically the isochronous data transfer services are used for large volumes of data carried between a data generator and a data receiver, for example, a digital video camera and multimedia electronics, such as a video display, or video editor. Isochronous data transfer communicates directly with the link layer 20 and bypasses the transaction layer 10. The transaction layer is only used for asynchronous data transfer. The majority of the bandwidth within the 1394 specification is reserved for isochronous data transfer, with twenty percent of the bandwidth being for asynchronous data transfer.

A node controller 75 is connected directly to the link and physical layers. The bus manager 55, the isochronous resource manager 65 and node controller 75 are each driven according to the CSR standard, IEEE 1212-1991. Other types of buses also utilize this CSR standard, expanding the connectivity of a 1394 bus. The CSRs are located within the serial bus management 40 and are represented as a management CSR 57, an isochronous CSR 67, and standard CSR 77.

The layer structure 2 including serial bus management 40 resides in each node along the bus. However, only one bus manager 55 and one isochronous resource manager 65 on the local bus is active. These managers exercise management responsibilities over the entire local bus. Since each local bus only needs (and may only have) one bus manager 55 and one isochronous resource manager 65, the other nodes disable their respective bus manager and isochronous resource managers. The node controller 75 is active for all operative nodes.

As stated above, the link layer 20 and physical layer 30 are generally embodied in hardware, for example, a chip available from Silicon System Design, Inc., or also available from Texas Instruments, Inc. The transaction layer 10, transport layer 80, application layer 90, and other functions of the transport interface will generally be implemented in software form, i.e., a software program executed once it is loaded into memory. In a preferred embodiment, the layers and functions are stored in firmware, e.g, codes programmed into a programmable storage device, such as a Read Only Memory (ROM), a Programmable Logic Array (PLA) or Disk Drive overlay. Further, the layers and functions could be programmed into an Application Specific Integrated Circuit (ASIC), by a method well known in the art. Generally, a collection of operations, such as those listed above operates faster in hardware rather than software, however, a software program is easier to change, correct, and update. The preferred embodiment of firmware combines advantages of both hardware and software.

Figure 3:
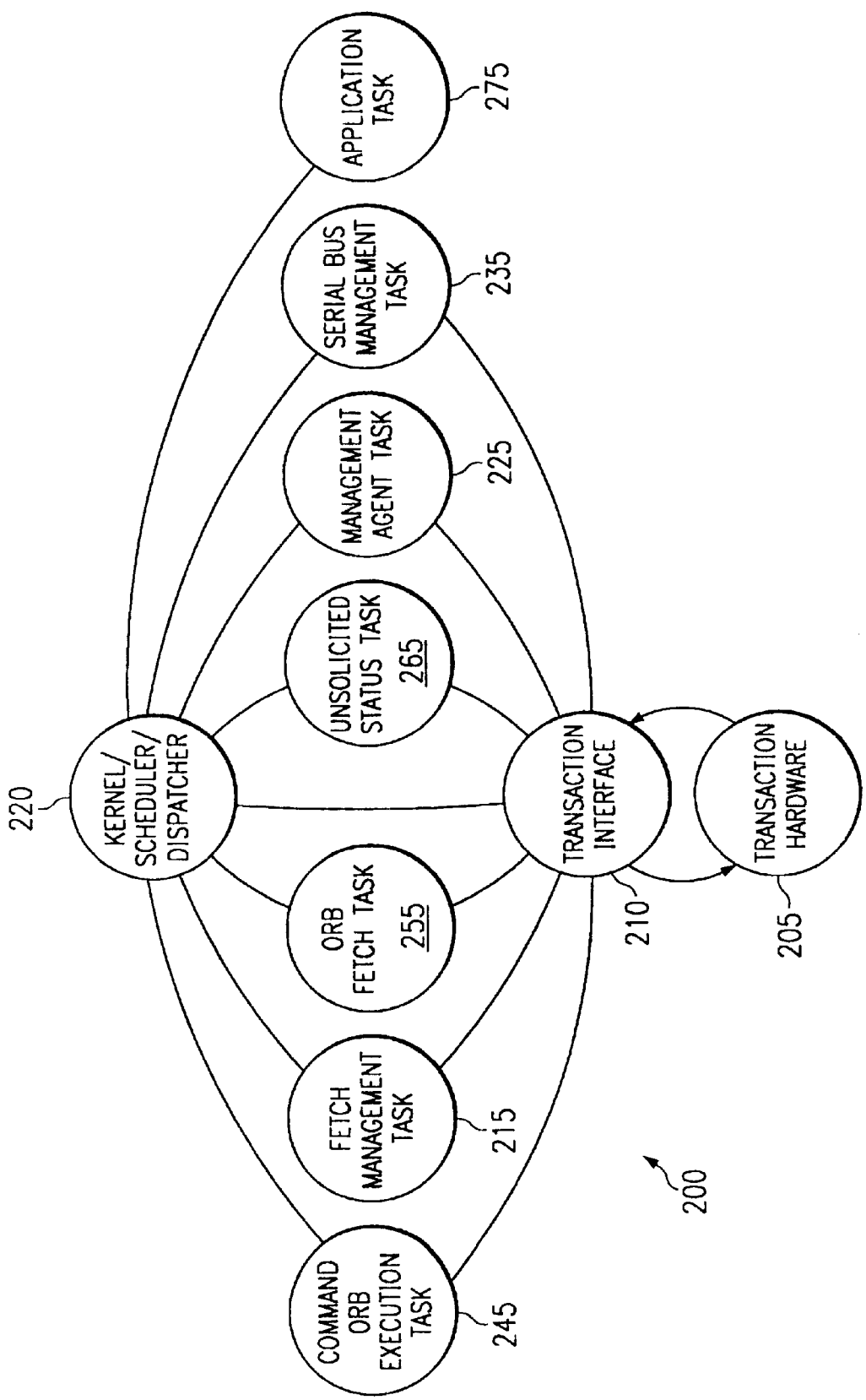
FIG. 3 is a diagram showing services and tasks according to an embodiment of the present invention.

FIG. 3 shows an embodiment of the present invention. A transport protocol interface 200 appears in each node on the bus, such as in the Hard Disk Drives 120, 122 or in the Printer 124 shown in FIG. 1. The Transaction Interface 210 embodies some of the components shown in FIG. 2. With reference to the components shown in FIG. 3, a chip embodying Transaction Hardware 205 could be the previously mentioned chips by Silicon System Design or Texas Instruments. The Transaction Interface 210 implements the 1394 transaction layer. The Serial Bus Management Task 235 implements bus management functions, such as reset or power on reset. The remainder of the representations shown on FIG. 3 implement functions and commands determined by the transport layer, such as SBP-2, in conjunction with the application layer, such as RBC.

With the exception of the Transaction Hardware 205, representations in FIG. 3 can be divided into two classifications, services and tasks. A task can schedule other tasks or call services. A service can only respond when called by a task, and when complete, returns to the calling task. The Transaction Interface 210 is a service, along with a Kernel/Scheduler/Dispatcher 220. The remainder of the representations shown in FIG. 3 are tasks, as described below.

The Transaction Hardware 205 monitors the 1394 bus and converts electrical signals sensed from the bus into data packets. The Transaction Interface 210 decodes the data packets received from the Transaction Hardware 205. These data packets are analyzed to determine if a task should be scheduled, a service called, or if no action is required. If a task or service needs to be started, the Transaction Interface 210 generates a message control block (MCB) based on the contents of the data packet and schedules the desired task or calls the desired service. Message control blocks are used for all inter-task or service communication and are further described below.

The smallest unit of data that the Transaction Interface 210 can operate upon is one data packet. A data packet is a group of data. At its lowest element, a digital datum is either a 1 or 0. Each individual piece of datum is called a bit. A collection of 8 bits is termed a byte, and a collection of 4 bytes (32 bits) is termed a quadlet. An asynchronous packet must be at least 4 quadlets, or 128 bits long. The first 128 bits are called a packet header. An asynchronous packet may also include a data block. The size of the data block varies but is limited to an absolute maximum based on the speed at which the 1394 bus is operating. The 1394 bus includes specifications to operate at 98.304 Mbps, 196.608 Mbps, or 393.216 Mbps. These speeds are often rounded to, respectively, 100, 200, and 400 Mbps, and are labeled S100, S200, and S400. When operating at the S100 speed, the maximum block size is 512 bytes (or 128 quadlets). When operating at S200 and S400, the maximum block size is 1024 bytes and 2048 bytes, respectively. When higher bus speed standards are approved, presumably maximum block size will increase as well.

The Transaction Interface 210 receives data from and transmits data to the 1394 bus. Concerning the transaction layer 10 of FIG. 2, there are three main functions that are sent in packets along the bus and processed by the Transaction Interface 210. These are read, write, and lock functions. For each of these functions, there are two main operations, request and response. A request is asking that a read, write or lock take place, and a response indicates that the read, write or lock was attempted, and includes a result.

Packets destined for the target node on which the Transaction Interface 210 sits are placed on the 1394 bus by an initiator. Packets routed to that particular node address are received at a receive bay in the Transaction Hardware 205 and an interrupt is generated to the Transaction Interface 210. Once the Transaction Interface 210 has completed its current task, an interrupt service routine is entered. In one embodiment, the seven types of packets that cause the interrupt are identified by a 4-bit transaction code contained in the packet header. The transaction codes for this embodiment of the invention are defined as follows:

TABLE 1

| Transaction Code | Meaning |
| --- | --- |
| 0 | Write request for data quadlet |
| 1 | Write request for data block |
| 2 | Write response |
| 4 | Read request for data quadlet |
| 5 | Read request for data block |
| 6 | Read response for data quadlet |
| 7 | Read response for data block |
| B | Lock response |

As described above, a quadlet is 4 bytes and a block is either 512, 1024, or 2048 bytes, depending on the speed at which the bus is operating. A write request for a data block is asking that a data block be written to a specified destination memory address at a particular node. A write request for a data quadlet is identical to a write request for a data block, however, the amount of data written to the specified destination address fits within one data quadlet. A read request for a data block and read request for a data quadlet are requests to retrieve data from the specified destination memory address at the specified node.

Write and read requests are responded to by sending responses, including both read and write responses for both data quadlets and data blocks. A read response for a data quadlet is sent in reply to a read request for a data quadlet, with the data requested passed back within the packet header. A read response for a data block is similar to a read response for a data quadlet, however, much more data is passed back. If for some reason the read request could not be performed, no data is sent back, but an error status may be sent to the requesting node. Write responses are sent in reply to a write request for either a data quadlet or a data block. The responses send back a response code indicating whether the write was successful, and if not, relays the specific reason why it failed. In the write response, the packet header includes this response code.

Lock requests and responses work similarly, by sending an address, argument value and data in the request, and by sending data back in a response.

Figure 10:
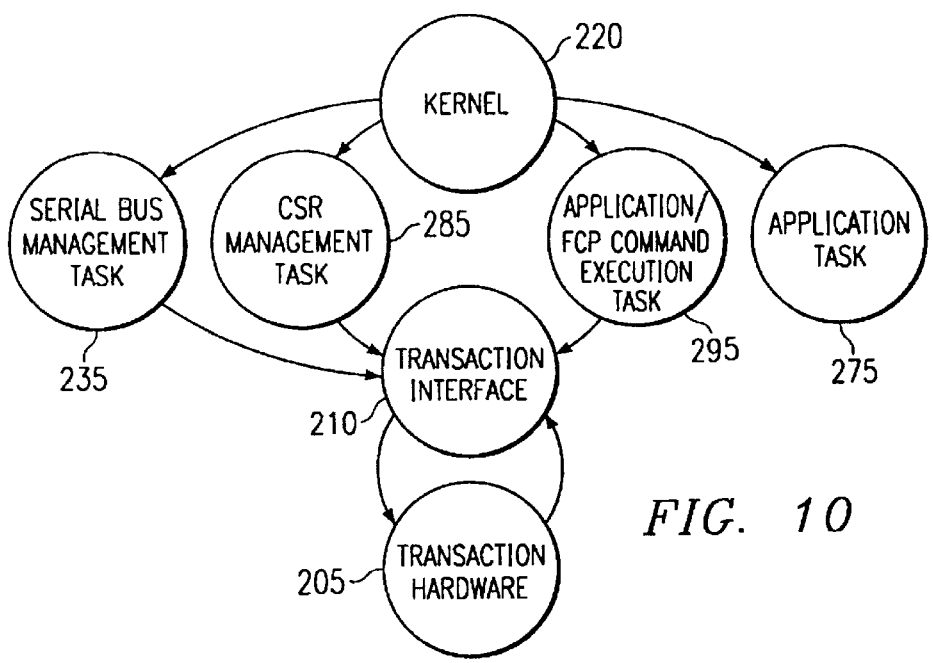
FIG. 10 is a diagram showing services and tasks according to another embodiment of the presenet invention.

With reference to FIG. 3, the Transaction Interface 210 and Kernel/Scheduler/Dispatcher 220 will be present for all embodiments of the invention. Additionally, one or more tasks will be present, depending on which protocol is used for the transport layer 80 and the application layer 90 shown on FIG. 2. In the embodiment shown in FIG. 3, seven tasks are shown. These tasks are structured to perform functions required when using the SBP-2 protocol for the transport layer 80. The invention is thus scaleable to accommodate any protocol used. For example, the embodiment shown in FIG. 10 shows tasks optimized for the FCP. Thus, one or more tasks can be used to implement any protocol desired.

In FIG. 3, the seven tasks shown enable the invention to work with the SBP-2 protocol. The Transaction Interface 210 takes different action depending on the transaction code received. For instance, when a write request for a data quadlet or a data block, or a read request for a data quadlet or a data block is received by the Transaction Interface 210, the Transaction Interface performs an ordered set of operations involving scheduling one or more tasks.

Services and tasks shown in FIG. 3 communicate with one another through message control blocks (MCB) placed in queues related to the services and tasks. Each task shown in FIG. 3 has at least one respective associated queue. Information transferred between tasks is only via MCBs. Each specific task has its own type of control block including data specifically needed by that task to operate. Shown in FIG. 3 are seven tasks, a Command ORB Execution Task 245 which uses a command message control (CMC) block, a Fetch Management Task 215, which uses a fetch management message control (FMC) block, an ORB Fetch Task 255, which uses an ORB fetch message control (OMC) block, an Unsolicited Status Task 265 which uses an unsolicited status message control (UMC) block, a Management Agent Task 225 which uses a management agent message control (MMC) block, a Serial Bus Management Task which uses a Serial Bus Message Control (SMC) block, and an Application Task 275 that uses an application message control (AMC) block. The services also have MCB's specifically for them. The Dispatcher 220 uses dispatch message control (DMC) blocks and the Transaction Interface 210 uses transaction message control (TMC) blocks. In addition, each task and service has at least one queue into which the respective MCB is placed. For instance, the Management Agent Task 225 has a management agent task queue structured to receive MMC blocks. Nothing in the architecture limits the association of tasks and queues. For instance, one task may have multiple queues or one queue may be associated with multiple tasks. Any degree of association between tasks and queues is possible.

As an example of one type of MCB, FIG. 4 shows a management agent message control (MMC) block. Since every MCB is different, there is no such thing as a standard message control block, however, the MMC block is representative of the types of data contained in MCB's. When a task wants to schedule the Management Agent Task 225, the scheduling task builds an MMC block and places it into an MMC queue. An MMC block 300, shown in FIG. 4, includes 44 bytes of data. Each byte is numbered along the left-hand side for reference and a byte offset numbered 0–15 indicates the individual bits making up the two bytes of each line. Data useful to the task is placed in the MCB as described in FIG. 4. For instance, the speed at which the bus is operating occupies bits 8, 9, and 10 (having an offset of 7, 8, and 9) of the first two bytes of the MMC block. An address for a management operation request block (ORB) is 6 bytes long and includes bytes 4–9. This data is necessary and used by the Management Agent Task 225 during operations.

To schedule a task or call a service from another task, several steps are taken. First, an MCB is created for the particular task or service. Then the MCB is placed into the queue associated with that particular task or service and a return code is sent back to the originating task. Then the originating task checks the return code. If the return code indicates that the MCB is not at the top of the queue, this means that the task is currently running and the originating task does nothing more. No action is taken because once started, a task operates on all of the MCB's in its queue until the queue is empty. Thus, the MCB recently placed in the task's queue will eventually be operated on, when it ascends to the top of the queue. If, however, the return code indicates that the MCB just placed into the task queue is already at the top of the queue, i.e., there are no other MCB's in that task queue, this tells the originating task that the scheduled task is not already running and must be started.

To start a task, the originating task creates a dispatch message control (DMC) block for the Dispatcher 220. The DMC block indicates which task is to be started and what priority is to be given to the DMC block. The Dispatcher 220 includes a related queue that is continuously checked for entries. As entries are received by the Scheduler 220 to start the desired tasks, they are placed into the dispatcher queue according to priority, with the highest priority being placed highest in the queue. As with all of the queues, the dispatcher or task will not be interrupted from operating on its current MCB, even when an MCB having higher priority is placed in its queue. Instead, the Scheduler 220 orders DMC blocks based on priority of the new block and the blocks currently pending in the DMC queue, but not the DMC block currently being operated on. When the DMC block reaches the top of the DMC queue, the Dispatcher 220 looks in the DMC block to see which task is to be called, and then informs the called task that there is an MCB sitting in its own queue waiting to be operated on. That initiates the scheduled task to begin operation. So, in order for one task to schedule another task or call a service to operate, either one or two MCBs must be created. First, an MCB is created specifically for the scheduled task and placed in its associated queue. A return code is then checked by the originating task. If the return code indicates the MCB was placed in the queue but not at the top of the queue, the initiating task does nothing more because the scheduled task is already running and will operate on the MCB when it moves to the head of the queue. If, however, the return code indicates that the MCB was placed at the top of the queue for the scheduled task, a DMC block is generated by the originating task that indicates which task is to be scheduled or service to be called, and what priority is to be given the DMC block. The Scheduler 220 then places the DMC block in the appropriate location in the DMC queue, ordered by priority. When the DMC block reaches the top of the DMC queue, the scheduled task or called service is alerted that there is an MCB in its queue and to begin operation. The desired task or service then begins, returns the DMC block to a free message blocks pool, and then operates on the MCB at the top of its own queue.

A common pool of resources exists for all MCBs. The message block pool is managed by the Kernel 220. The pool consists of a finite memory space from which MCBs can be created. As more MCBs are created, the amount of memory space left in the pool decreases. When no memory space remains in the free blocks pool, no more MCBs can be generated until more resources are supplied. Resources are supplied by returning MCBs back to the pool after they have been operated on and are no longer needed, i.e., when they are removed from the queue. When a task or service is finished using an MCB previously in its queue, it calls the Kernel 220 requesting that the MCB be placed back in the free blocks pool. It then moves the next free MCB to the top of its queue. Additionally, if a DMC block is necessary to start the task or service, the called task or service immediately returns the DMC block to the free memory blocks pool before operating its own MCB. The size of the free memory blocks pool is determined by the amount of memory available, and is fixed before any MCBs are allocated.

In addition to managing the dispatch queue and managing the free message blocks pool, the Kernel/Scheduler/Dispatcher 220 also performs other functions in 1394 bus transactions. The Kernel 220 initializes the data structures, timers, and interrupt vectors. All tasks that are timed require a timer. The Kernel 220 provides such timer management services as starting, stopping, restarting, checking, deleting and providing an interrupt based on the timers. The timers are allocated when requested by a task through a call to the Kernel services. Each timer currently active is adjusted every clock cycle. In one embodiment, a timer is initialized with a given number, which is decremented each clock cycle. When the timer value reaches zero, a notification is sent to the task associated with that timer.

As stated above, the particular tasks chosen to work with the Transaction Interface 210 and the Kernel/Scheduler/Dispatcher 220 depend on the transport layer 80 used in the particular system. In the embodiment shown in FIG. 3, the tasks have been selected to operate with the SBP-2 protocol for the transport layer. When other transport layer protocols are used, other tasks may be present or some of the tasks shown in FIG. 3 may not be present. In this way, the Transport protocol interface 200 is extremely flexible and scaleable, allowing for as much customization as is desired.

As shown in the embodiment shown in FIG. 3, the Conmmand ORB Execution Task 245 operates on data and status transactions between the Application Task 275 and an initiator, typically located at a different node. In operation, the initiator will send data to or receive data from the Application Task 275. The Command ORB Execution Task 245 is the principle throughway for the data and status messages between them. The Fetch Management Task 215 ensures that an operation received at a particular node was intended for that node. If the operation is at the correct node, the Fetch Management Task 215 updates a variable used to indicate a current state of an agent. The ORB Fetch Task 255 receives several ORBs containing commands from an initiator, and passes them to the Application Task 275 to execute. The Unsolicited Status Task 265 sends a status message to the initiator when requested by one of the other tasks. The Management Agent Task 225 performs management-type functions requested by the initiator, including access requests, logging in, setting passwords, etc. The Serial Bus Management Task 235 functions as an interface between the serial bus management 40 on nodes of the 1394 bus and the Application Task 275 for the same node on which the Serial Bus Management Task sits. Finally, the Application Task 275 operates to execute upper protocol commands found in the Application Layer 90 of FIG. 1. The Application Task 275 is the ultimate origination or destination of the majority of data transferred along the 1394 bus.

The Transaction Interface 210, in addition to receiving packets destined for the local node as described above, also prepares packets destined for other nodes. Once prepared, the Transaction Interface 210 transfers the packets to the link layer 20 where they are synchronized and sent to the physical layer 10 for conversion to electrical signals to be placed on the bus. Depending on the type and amount of data to be sent from the Transaction Interface 210, a transmit bay, payload data transmit bay, and/or a Direct Memory Address (DMA) channel may be used. If the amount of data to be sent from the Transaction Interface 210 is large, it may be broken up into several packets to be placed on the bus. Each packet is prepared and then sent along the bus.

Tasks desiring to send data to a node other than the one that they are on send the data through a transmitting portion of the Transaction Interface 210. The Transaction Interface 210 includes at least two queues to hold TMC blocks, one for time critical transactions and one for non-time critical transactions. Data to be sent along the bus are packaged into TMC blocks and placed into the time-critical or non-time critical queue as desired. The non-time critical TMC queue is used for data block transfer requests and responses, whereas the time critical TMC queue is used for responding to a request within a split transaction subaction. It may take multiple transactions to complete a non-time critical TMC block request. Once the transactions are complete, the Transaction Interface 210 sends notice to the task that is sending the data that the task is complete.

Each transaction that is initiated by the Transaction Interface 210 has a hardware timer associate with it. The hardware timer is used for timekeeping the transaction timeout. A retry count field of the TMC block is incremented if the data transmission is unsuccessful. As long as the retry count is below the programmable maximum number of retries, the Transaction Interface 210 will attempt to send the data again. If the maximum retry count has been exceeded, a status message is sent back to the calling task informing it of the failure. At the completion of a transaction, i.e., the Transaction Interface 210 received an acknowledgment from the node to which the data is being sent, the Transaction Interface 210 schedules a transaction completion status or other response data to return to the calling task. The data is placed into a DMC block and sent through the Dispatcher 220 to the calling task.

FIG. 5A shows the structure for a transaction memory control (TMC) block 310. As stated with reference to FIG. 4, every MCB is different and contains data particular for the task or service to which it is associated. TMC blocks are associated with the Transaction Interface 210. When any task or service of the Transport Protocol Interface 200 needs to send data to the Transaction Interface 210, it requests from the Kernel 220 a message control block and formats a TMC block according to the data specifications shown in FIGS. 5A–5I and as described herein.

Located at word 0, bits 8–15 of the TMC block 310 is the "task_ID". This field is used to identify the requesting task identification, i.e., one of the task shown in FIG. 3. It is used by the Transaction Interface 210 to return a status of the transaction request to the identified task. Also in word 0, bit 7 is the "grp" bit. This bit indicates whether the particular TMC block is linked in a group with other TMC blocks. Bit 6 contains and indicator "conf" to indicate that a completion status, or confirmation, is required once the Transaction Interface 210 has completed a subaction. If the TMC block is a member of a group of linked TMC blocks, only one "conf" bit, in the last TMC block, should be set to 1. Bit 5 of word 0 is used to indicate when an abort function is received. A TMC block with an "abrt" bit will not be processed. The "dta" bit in bit 4 is used by the requesting task to indicate that the data it is transmitting in the TMC block 310 is encapsulated data. The "transaction_count" in bits 0–3 of word 0 enables the Transaction Interface 210 to track the number of outstanding transaction requests. Each time the Transaction Interface 210 sends a data packet to the serial bus, it increments transaction_count. Every time the Transaction Interface 210 receives a transaction response from the node to which the data packet was sent, the Transaction Interface decrements the transaction_count. In this way, the Transaction Interface 210 always knows how many outstanding transaction responses for which it is waiting.

The entirety of word 1 of the TMC block 310 includes the "login_ID" field. This is used by the Transaction Interface 210 to help determine which TMC blocks should be aborted when an abort command is sent by an initiator having that specific login identification. In word 2, bits 11–15 and 3–7 are reserved for later use. Bits 8–10 identify a "retry_count" field that specifies how many times the Transaction Interface 210 should try to send the data before an error is declared. Also in word 2, bits 0–2 specify at which speed the 1394 bus is operating. A value of 0 in this field indicates S100, 1 indicates S200 and 2 indicates S400. The remaining data values available, that is values 3–7, will be specified on other 1394 specifications are adopted.

The entirety of word 3 of the TMC block 310 is "max_data_transferred_length." This field specifies the largest data transfer length for a data packet. Word 4 specifies the "destination_ID" field, indicating the destination address that is associated with this particular TMC block. In word 5, bits 10–15 specify a "transaction_label" field. This field is used in both request and reply packets. In a request packet, the requesting task leaves this field blank and the Transaction Interface 210 generates a value to be placed into this field uniquely identifying the request. In a reply packet, the requesting task fills this field with the transaction_label of the packet to which it is replying. This value was generated by another Transaction Interface on the node that sent the initial request, and is used by that Transaction Interface to match the reply to the outstanding request. In word 5, bits 8–9 are reserved. Bits 4–7 specify a "transaction_code." These codes are the same as those shown in Table 1. Bits 0–3 of word 5 allows a priority to be set, but this field only has meaning in the backplane, and not cable, environment. The remainder of the data, words 6–30 of the TMC block 310 depend on the type of packet sent to the Transaction Interface 210. The different packets will vary depending on what type of transaction is requested of the transaction interface, e.g., write request for data block, read request for data block, etc. FIGS. 5B–5I show different types of packet-dependent data, for use within the TMC block 310.

FIG. 5B shows the packet information 312 for a write request for a data block packet, or a read request for a data block packet when the "dta" bit of the TMC block 310 is set to 0. Setting the "dta" bit to 0 indicates that the transmitted data is not encapsulated in the TMC block, but rather, the data is in a data buffer. The packet-dependent information 312 of FIG. 5B is used when a task wishes to send data to a host or read data from a host. Since the actual data is in the data buffer and not the TMC block packet, mostly addresses, and not the data itself are sent. For instance, words 6–8 include an offset address of where the data is to be written to or read from the host. Words 11 and 12 indicate the starting address of the payload buffer, while words 13 and 14 indicated how many bytes the total payload includes. As described above, there is a maximum size of how large a data packet may be depending on the speed of the 1394 bus. Recall that at S100, the maximum data transfer length per data block is only 512 bytes. A read or write request may be much larger than this, even hundreds of thousands of times larger. The address and count data kept in the packet information 312 enables the Transaction Interface 210 to track how much data has been sent or received, as described below.

FIG. 5C shows the packet dependent information 314 for a write request for a data block packet when the "dta" bit of the TMC block 310 is set to 1. Setting the "dta" bit indicates that the data actually being transmitted is encapsulated within the TMC block 310 within words 15–30. The remainder of the fields stored in the packet dependent information 314 are similar to those shown in FIG. 5B.

FIG. 5D shows packet dependent information 316 for the transaction of a write request for a data quadlet. Recall from above that a data quadlet contains merely 32 bits of information, and for this request is stored in words 9 and 10 of the packet information 316. FIG. 5E shows packet dependent information 318 for a write response packet. A write response is generated following a write request. Since, unlike a read response, a write response does not return any written data, the write response need only indicate whether the write response was successful or had an error. This information is stored in bits 12–15 of word 6, while all of the other bits of the packet dependent information 318 are reserved. FIG. 5F shows packet dependent information 320 for a read request for a data quadlet. Since a read request only contains the address of the data it desires to read, the information required in packet dependent information 320 is very short in this case only making up words 6–8.

FIG. 5G shows packet dependent information 322 for a read response for a data block. A read response for a data block returns a large amount of data back to the requester. Since so much data is requested, a direct memory address (DMA) channel is used. A DMA channel allows large amounts of data to be transferred quickly with minimal overhead, as is known in the art. The packet dependent information 322 for this type of transaction provides a mechanism for the Transaction Interface 210 to track how much data has been sent back in the read response, as described below.

FIG. 5H shows packet dependent information 324 for a read response for a data quadlet. Unlike the read response for a data block, shown in FIG. 5G, the read response for a data quadlet is very short, and fits entirely within words 9 and 10 of the packet information 324. FIG. 5I shows packet dependent information 326 for a lock response. As required by the 1394 specification, four words of the old value of the data locked are sent with the lock response. These old values are contained in words 11–14 of the packet information 326.

Figure 6:
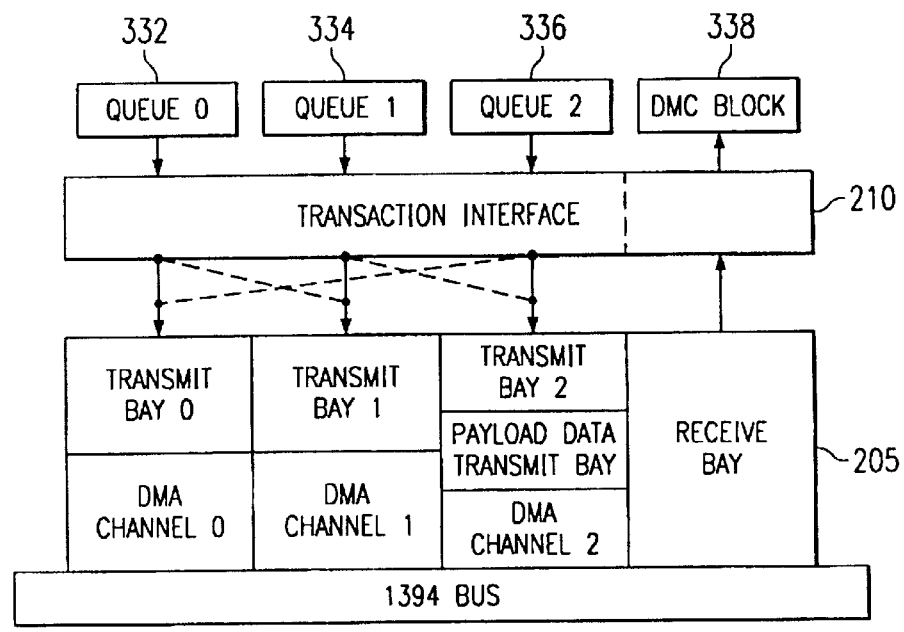
FIG. 6 is a diagram showing data flow of the transaction interface.

FIG. 6 is a detailed view showing the communication channels between the Transaction Interface 210 and the Transaction Hardware 205, shown in FIG. 3. In a preferred embodiment, the Transaction Interface 210 receives TMC blocks from the tasks and services of FIG. 3, at one of three queues, 332, 334, 336. Correspondingly, the Transaction Hardware 205 includes three transmit bays, transmit bay 0, transmit bay 1, and transmit bay 2. The transmit bays are typically embodied in hardware, for instance, in the link chips previously mentioned. A hardware register serves as an interface between the Transaction Hardware 205 and the Transaction Interface 210. Additionally, related to the respective transmit bays, are DMA channels. These DMA channels are used to carry large amounts of data, for instance, each data block sent through a DMA channel will be the largest allowed by the speed of the 1394 bus as previously described. This contrasts with the transmit bays that transmit small amounts of data (e.g., 16 bytes) and are the same size no matter what the speed of the 1394 bus. Unique to the transmit bay 2, is an additional piece of hardware called the payload data transmit bay. This payload data transmit bay is used when the Transaction Interface 210 is sending a lock response to an initiator over the 1394 bus. The payload data transmit bay allows additional data to be placed on the 1394 bus coincident with the transmit bay 2, which can only carry limited data. It is used when more data must be sent to a node on the 1394 bus than can fit within one of the transmit bays, but is not large enough, to fill a DMA channel.

Additionally, the Transaction Hardware 205 contains a receive bay where packets destined for the node on which the Transaction Interface 210 sits are received by the Transaction Hardware 205. These packets are read by the Transaction Interface 210, and routed to the appropriate task of FIG. 3, by requesting and filling a DMC block 338, as described above.

In the preferred embodiment shown in FIG. 6, the Transaction Interface 210 supports three transmit bays. Each transmit bay has its own respective TMC queue that receives specific request functions. The TMC queues 332, 334, 336 differ in priority, that is the task of FIG. 3 that is requesting the services of the Transaction Interface 210 places its TMC block in the queue appropriate for the priority of the request.

Transmit bay 0, and correspondingly queue 0, are used to request non-time critical requests, for instance, normal data requests to or from a host. Transmit bay 1, and corresponding TMC queue 1 are used for non-time critical requests that are short, for instance, reading a page table from a host, as later described. Finally, transmit bay 2 and corresponding queue 2 are used for time critical requests such as split transaction response requests. A split transaction response request is used, for example, in a CSR write or a CSR read request from an initiator. When the local node is responding to a CSR write or a CSR read, first an acknowledgment is sent back to the initiator that the CSR read or write is pending. That is the first action of the split transaction. After the acknowledgment is sent, the address of the CSR write or read is verified in the Fetch Management Task 215 and then a response is sent back to the initiator. Because there is a maximum time specification between when the acknowledgment is sent and when the actual data is sent, these split transactions receive the highest priority. Therefore, the transmit bay 2 and corresponding queue 2 are used specifically for this purpose.

Preparing the data received in a TMC block 310 from one of the queues to be sent on the 1394 bus is performed as follows. First, the Transaction Interface 210 decodes the TMC block received at the queue to determine how much and what kind of data is being sent to the 1394 bus. Then, the data is formatted into a packet header, and if required, a data packet as per the 1394 bus specification. If the amount of data is larger than can be sent in one data block, the Transaction Interface 210 prepares a first data block, loads it into the appropriate DMA channel, which the Transaction Hardware 205 places the first data block on the 1394 bus. Subsequent data blocks are prepared and loaded into the DMA channel sequentially until the entire amount of requested data is sent to the initiator. There is necessarily a delay time between when the data block is loaded into the DMA channel of the Transaction Hardware 205 and when the next data block can be loaded into the same DMA channel. While any one delay period between the time when the DMA channel of the Transaction Hardware 205 is loaded and is again free to accept new data is short, the compilation of multiple delay periods prohibits efficient data transfer from the Transaction Interface 210 to the 1394 bus. For this reason, the Transaction Interface 210 is designed to utilize other transmit bays and DMA channels of the Transaction Hardware 205 that are not presently in use.

This utilization of multiple DMA channels of the Transaction Hardware 205 saves time because it reduces the overall delay time from when data is placed into the DMA channel of the Transaction Hardware 205 and when the next block of data can be placed. For example, assume a request comes through one of queues of the Transaction Interface 210 to send ten blocks of data to the 1394 bus. If each block of data received from a queue was required to be sent over the queue's respective DMA channel, at least nine delay periods would be required to send all ten blocks. Assuming the DMA channel is open for the first data block, there is no delay time in sending the first data block through the DMA channel. However, the first delay period will occur between sending the first data block and the second data block. A second delay time will occur between sending the second data block and the third data block, and so on until the tenth data block is sent. The inventive Transaction Interface 210 allows data blocks received from any queue to utilize any available DMA channel of the Transaction Hardware 205. Using the previous example, assume that ten data blocks must be sent from the Transaction Interface 210. Also assuming that all three DMA channels are available, the first data block is loaded into the DMA channel associated with the queue through which the data send request was received. While the Transaction Interface 210 is waiting for the DMA channel of the Transaction Hardware 205 to send its data over the 1394 bus, the Transaction Interface checks to see if any other DMA channels are available. If so, those DMA channels are immediately loaded. As soon as the DMA channels of the Transaction Hardware 205 are loaded, the data blocks are sent over the 1394 bus. Although there is still a delay time between loading the data into the DMA channel and receiving an indication from the Transaction Hardware 205 that the DMA channel is ready to be loaded with the next subsequent block, the inventive Transaction Interface 210 reduces the total amount of delay by as much as three times. Once the Transaction Interface 210 receives notification that the DMA channels are again available, blocks 4, 5, and 6 are loaded. Following the second delay time, blocks 7, 8, and 9 are loaded and sent. Following one additional delay, block 10 is loaded in the associated DMA channel and sent. In comparison, whereas sending ten blocks using only one DMA channel includes a delay penalty, at a minimum, of nine delay times, parallel usage of all the available DMA channels, in this example, can limit the delay periods to three (one after block 3, one after block 6, and one after block 9).

Every DMA channel of the Transaction Hardware 205 will not necessarily be available when needed by the Transaction Interface 210. However, utilizing a dynamic system which allows the use of free DMA resources, when available, uses the Transaction Hardware 205 in the most efficient way possible.

The standard procedure for the operation of Transaction Interface 210 is that each respective TMC queue, 332, 334, and 336 utilizes its own transmit bay, i.e., queue 0 utilizes transmit bay 0, queue 1 utilizes transmit bay 1, and queue 2 utilizes transmit bay 2. However, as described above, the Transaction Interface 210 can be much more efficient if the queues can utilize the other DMA channels of the Transaction Hardware 205 when they are not being used by their own queue. In the preferred embodiment, only one payload transmit bay exists, and is related to queue 2. Therefore, any data sent via the Transaction Interface 210 that uses the payload data transmit bay must be sent through queue 2, 336. Since neither the hardware associated with queue 0 nor queue 1 contain a payload data transmit, the messages utilizing the payload data transmit bay must be sent over transmit bay 2. It is understood that this description of the preferred embodiment of the Transaction Interface 210 and its interconnection with the Transaction Hardware 205 is illustrative only, and variations are expressly included. For instance the number of queues and transmit bays may be any number, and is only limited by the hardware and resources available to the Transaction Interface 210. Additionally, more than one transmit bay may include a payload data transmit bay, thereby allowing these type of transactions to be sent to any of the queues.

Figure 7A:
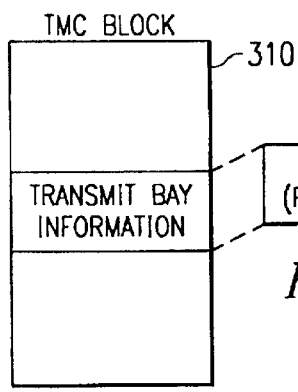
FIGS. 7A–7C are diagrams showing how data is presented to the transmit bay depending on how much data is being sent.

FIG. 7A shows how data is provided to the Transaction Interface 210 in a TMC block 310 through one of the queues, and ultimately is sent to the transmit bay. In the example represented in FIG. 7A, the requesting task is asking the Transaction Interface 210 to transmit data utilizing only the transmit bay, and not a DMA channel nor a payload data transmit bay. A task will request the Transaction Interface 210 to send data only using the transmit bay when very little data is sent, because all data sent must fit within the very short packet header. For this reason, the only type of requests using the transmit bay only are a write response request, or a read request for a data quadlet. The packet dependent data, contained in words 6–30 of the TMC block of FIG. 5A for these requests is shown in FIGS. 5E and 5F, respectively. The requesting task writes the transmit bay information shown in these Figures into the TMC block 310. The Transaction Interface 210 then loads the transmit bay information into an available transmit bay and sets a trigger bit in the Transaction Hardware 205. This trigger bit is incorporated in the Transaction Hardware 205 and used by the transaction hardware to determine when it should send data contained in the transmit bay to the 1394 bus. As described above, the particular transmit bay into which the information from the TMC block 310 is loaded into will depend on which transmit bay is available. First the transmit bay that is associated with the queue through which the particular TMC block came will be checked for availability. If that transmit bay is available, it will be used. If, instead, the associated transmit bay is busy, the remainder of the transmit bays will be checked for availability. If another one of the transmit bays are available, the available transmit bay will be used. This enables the Transaction Interface 210 to send data to the 1394 bus in an expedient manner. Once the data in the transmit bay is sent to the 1394 bus, a response is sent from the node to which the data is sent, indicating that the data was received. The Transaction Interface 210 then sends a confirmation notice to the requesting task that the information desired to be sent was, in fact, sent.

Figure 7B:
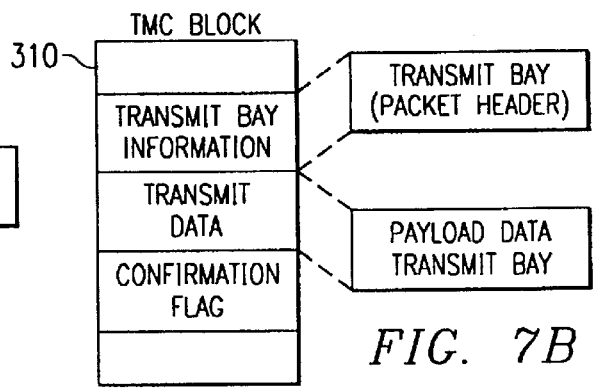

FIG. 7B shows a transmit request that utilizes both the transmit bay and the payload data transmit bay. The type of request that utilizes the payload data transmit bay is a lock response from the 1394 specification. The transaction code for this response is listed in table 1. The packet information of the TMC block 310 for a lock response was described with reference to FIG. 5I. Particularly, the data that will be included in the payload data transmit bay is sent to the Transaction Interface 210 in words 11–14 of the TMC block 310. When the Transaction Interface 210 receives a request for a lock response, it simultaneously loads the transmit bay information into the transmit bay and the transmit data into the payload data transmit bay, and then sets a trigger bit in the Transaction Hardware 205 to indicate to the transaction hardware that data is ready to be sent over the 1394 bus. As described above, a request for a lock response must be sent through queue 2,336 because transmit bay 2 is the only transmit bay that includes a payload data transmit bay.

Figure 7C:
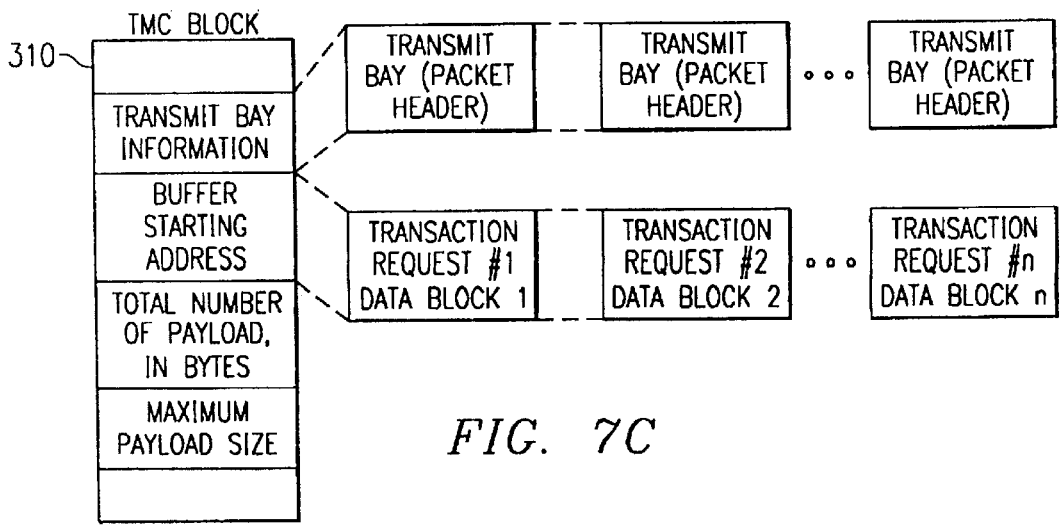

FIG. 7C shows how data included in a write request, read request or read response for a data block is sent from the requesting task to the Transaction Interface 210 and onto the 1394 bus. The requesting task fills the packet dependent information of the TMC block 310 with data according to that as represented in FIGS. 5B and 5G. With reference to FIG. 5B, some of the information making up the transmit bay information of the TMC block 310 in FIG. 7C is included in words 6–10. The buffer starting address is included in words 11 and 12 and the total amount of data, in bytes, is sent in words 13 and 14. Given this information, the Transaction Interface 210 assembles a first packet header to be loaded in the transmit bay and a first data block, data block 1. This data block will include as much data as can be sent in one packet, as limited by the speed of the 1394 bus. The requester task sends the maximum payload size in the TMC block 310, as illustrated in FIG. 7C. The Transaction Interface 210 formats all of the data blocks needed to complete the transaction request. The first data block will send the maximum allowable size, as will the second data block, and the third until all of the data sent by the requesting task is assimilated into data blocks. Data block n, the last data block containing data from the particular request, will contain (total size of payload–(n*maximum payload size)) bytes. As described above, the data blocks 1, 2, n will be sent via the Transaction Hardware 205 in the most efficient manner.

If the requesting task is sending data to noncontiguous memory locations, that is the data is being sent into fragmented memory, the requester will format one TMC block per each segment in the page table. Prior to formatting the TMC block, the requesting task will request a page table as a map for a fragmented memory. Therefore, it is the responsibility of the requesting task to format multiple TMC blocks, one TMC block for each page table segment. If the data contained within the page table segments is grouped, the requesting task will set the "grp" bit, word 7, bit 7 to 1, to indicate to the Transaction Interface 210 that the data in the separate TMC blocks is linked. The requesting task will also set the confirmation bit, word 0, bit 6, to 1 in the TMC block of the last page table segment. Therefore, the Transaction Interface 210 need not calculate discontinuous memory locations, but rather the requesting task will provide the memory locations to the Transaction Interface.

Figure 8:
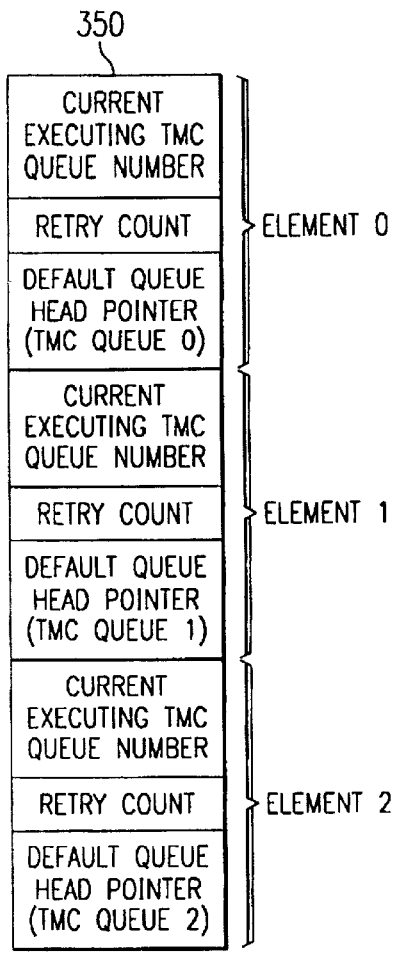
FIG. 8 is a diagram showing the data structure used to coordinate sending data to the 1394 bus.

FIG. 8 shows a data structure used to support the communication between the transition interface 210 and the Transaction Hardware 205 for the support of multiple transmit bays. A data structure 350 comprises one element for each transmit bay in the Transaction Hardware 205. Each element is further divided into three fields, "current executing TMC queue number", "retry count", and "default queue head pointer." The "current executing TMC queue number" field indicates which queue is currently accessing the transmit bay for each particular element. For instance, if the transmit bay 0 is currently performing a request for a data transfer that originally was sent to the Transaction Interface 210 via the queue 1, 334, a number representing queue 1 will be entered into the "current executing TMC queue number" for element 0. Once complete, this field is filled with an initial value. Detecting for the presence of this initial value indicates whether a particular transmit bay is currently being used. The "retry count" field is incremented each time the transaction interface attempts a retry. Once the retry count field equals the "retry_count" contained in word 2, bits 8–10 of the TMC block 310, no more retries takes place and the Transaction Interface 210 terminates the current transaction. An error is then reported to the requesting task. Once the error is reported, the retry count field of the data structure 350 is reset to an initial value. Finally, the default queue head pointer of each element is stored in the last field for each element. Values in this data structure 350 are updated by the Transaction Interface 210 during normal operation.

Once the Transaction Interface 210 has sent a packet along the data bus, a response is received by the receive bay portion of the Transaction Hardware 205 for the node from which the data was sent. The response is decoded by a transmit interrupt handler in the Transaction Interface 210. The response codes that the Transaction Interface 210 can receive back are abort condition, transaction complete, acknowledge received, arbitration lost, acknowledge missing and subaction gap. These response codes are used in combination with the "transaction_count", located in word 0, bits 0–3 of the TMC block 310 to determine what response the Transaction Interface 210 should make back to the requesting task. The "transaction_count" entry records the number of outstanding transaction requests for the particular TMC block. For instance, if a requesting task is sending ten blocks to another node, after each block is sent by the Transaction Hardware 205, the "transaction_count" is incremented by one. Every time a transaction response is received for that TMC block, the "transaction_count" is decremented by one. Therefore, if the "transaction_count" field within the TMC block 310 is anything other than zero, packets have been sent to a node on the 1394 bus, but no response received.

When the transmit interrupt handler of the Transaction Interface 210 receives a transaction response indicating an abort condition, the "transaction_count" field for the TMC block 310 is checked. If the "transaction_count" is 0, indicating that all sent packets have been accounted for, the current TMC block in the queue for the Transaction Interface 210 is removed. If, the abort condition response is received but the "transaction_count" is greater than 0, the Transaction Interface 210 waits to receive all of the outstanding transaction responses, that is, wait until the "transaction_count" equals 0. Once the "transaction_count" equals 0 the current TMC block 310 is removed from the queue of the Transaction Interface 210.

If the transaction response indicates that the transaction is complete, the "transaction_count" and payload byte count fields of the TMC block 310 are checked. If the payload byte count is greater than 0, packets remain to be sent, and the Transaction Interface 210 continues to send the next data packet. If the payload byte count is 0 but the "transaction_count" is greater than 0, the Transaction Interface 210 waits for the "transaction_count" to return to 0, as described above. If both the payload byte count and the "transaction_count" are 0, the request is complete and the Transaction Interface 210 sends a response to the requesting task that the transaction was completed without error.

If the transaction response is that the acknowledge was received, the Transaction Interface 210 informs the requesting task that the transaction was complete without error. If the transaction response indicates that arbitration has been lost on the bus, the Transaction Interface 210 informs the requesting task that the transaction completed but there was an error. If the transaction response indicates that an acknowledge is missing or that there was too large of a subaction gap, the retry count field is checked. If the retry count field of the data structure 350 is less than the limit of the "retry_count" of word 2, bits 8–10 of the TMC block 310, the Transaction Interface 210 attempts to retry the transaction. Conversely, if the retry count is equal to or greater than the "retry_count" limit for the number of retries, an error is reported to the requesting task.

Figure 9:
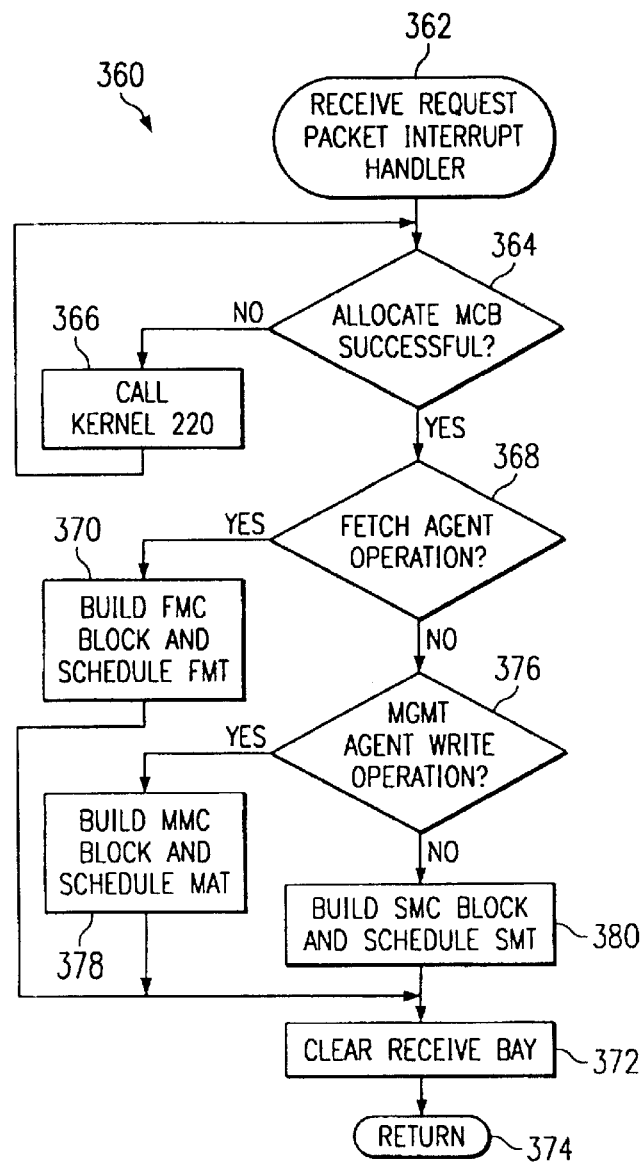
FIG. 9 is a flowchart diagram showing execution flow when a data packet is received at a node on the 1394 bus.

The Transaction Hardware 205, as described above, also includes a receive bay. The receive bay accepts the data packets from the 1394 bus and determines which task, shown in FIG. 3, should receive the data from the data packet. FIG. 9 is a flow chart showing the execution flow 360 when a receive packet is received at the receive bay of the Transaction Hardware 205. The execution flow is carried out via an interrupt service routine, which activates when the data packet is received. The use of interrupt service routines when an event unpredictable in time occurs is well known in the art. A data packet is received from the 1394 bus at the receive bay of the Transaction Hardware 205 at a step 362. This data is sent to a procedure in the Transaction Interface 210. The Transaction Interface 210 requests a memory control block from the Kernel 220. If no memory resources are available, the Transaction Interface 210 calls a special routine in the Kernel 220. The Kernel 220 acknowledges that it owes the Transaction Interface 210 the next available MCB. This is unlike the memory resources allocation for tasks and services as described above, because if other tasks request an MCB and none is available, a list is kept ordering which task receives the next MCB. Since, in the preferred embodiment, there is only one receive bay in the Transaction Hardware 205, the Transaction Interface 210, when there is data in the receive bay, gets priority over all other tasks to receive the next available memory control block from the Kernel 220. All the while the data is in the receive bay and no MCBs are available, no other data packets can be received by the receive bay hardware of the Transaction Hardware 205.

Once the MCB is successfully allocated in step 364, the Transaction Interface 210 looks in the data packet to determine what memory location of the local node is desired to be accessed. Addresses for two different types of operations are kept. First, the destination offset (sent by the received packet) is matched against a table of fetch agent addresses in a step 368. If the addresses match, an FMC block is requested, filled by the Transaction Interface 210, and then the Fetch Management Task 215 of FIG. 3 is scheduled through the Scheduler 220 in a step 370. Once scheduled, the Transaction Interface 210 clears the receive bay at a step 372 in order to accept other data. In a step 374, the receive request handler of the Transaction Interface 210 returns from the interrupt and continues processing.

If, instead, step 368 indicates that it did not receive a fetch agent operation, the destination offset of the received data packet is matched against a management agent register of the target in a step 376. If the data packet is a management agent write operation, an MMC block is requested from the kernel 220 and the Management Agent Task 225 of FIG. 3 is scheduled in a step 378. Once the Management Agent Task 225 is scheduled in the step 378, the receive bay is cleared in step 372 and the interrupt service routine returns in step 374.

If instead, the destination offset falls outside the range of both range fetch agent addresses and the management agent register, it is assumed that the packet is a CSR operation. Therefore, in step 380, an SMC block is requested from the Kernel 220 and the Serial Bus Management task 235 of FIG. 3 is scheduled. Again, the receive bay is cleared in step 372 and the interrupt service routine returns in step 374. The interrupt service routine portion of the Transaction Interface 210 does not check the validity of the data received in the data packet. Instead, the interrupt service routine schedules the appropriate task, which performs its own data checking as described below.

Turning now to some of the specific instances of the tasks shown in FIG. 3, the Management Agent Task 225 responds to management type requests from an initiator. In response to a management agent CSR write sent by the initiator node, the Management Agent Task 225 fetches a management ORB from the initiator and then executes the ORB function. Examples of ORB functions include login, set password, reconnect, and terminate task. If the Management Agent Task 225 must communicate back to the initiator, it uses the transmitting portion of the Transaction Interface 210.

The Management Agent Task 225, after the task sends the data to the initiator, the task then becomes suspended pending notification from the Transaction Interface 210. When the Transaction Interface 210 completes the data transaction with the initiator, the transaction interface wakes up the Management Agent Task 225 by making a system call to the Scheduler 220. The Management Agent Task 225 then continues its execution of the management ORB for that task. Once complete, the Management Agent Task 225 discards the MMC block from the top of its queue, calls the kernel to return the MMC block to the free memory block pool, and begins operation on the next MMC block in its queue, if any. If the management ORB contains a login command, the Management Agent Task 225 creates an OMC block and a login descriptor list. The OMC block and login descriptor list are removed after the initiator logs out.

The Application Task 275 represents the application that would be operating at one of the nodes on the 1394 bus, for instance, high speed printers, high speed storage, or audio visual applications. Applications communicate via their native protocols using specific application protocols, such as Reduced Block Commands (RBC) for hard disk drives, Printer Working Group (PWG) for printers, or Internet Protocol (IP) for networks. Several applications can operate at one time on any given node. Each application decodes, validates, and executes commands delivered to it. Each separate application has a separate queue, identified by a number based on how many applications are running.

The ORB Fetch Task 255 functions to retrieve multiple command ORBs from one initiator at a time, passing the encapsulated commands to the Application Task 275 for execution. For every new fetch, a system call is made to determine the AMC block address requesting the fetch. This block address is then saved in the OMC block corresponding to the initiating task. The ORB address is retrieved from the OMC block. Then, the Transaction Interface 210 is scheduled to read and return the command ORBs. If the data comes back without error, an AMC block is generated and placed into the AMC queue, sending the retrieved data to the proper application task. Depending on how many initiators are present, the ORB Fetch Task 255 may limit the total number of ORBs in each fetch in order to provide fairness arbitration.

The Command ORB Execution Task 245 provides for data transfer requests and status delivery on behalf of the Application Task 275. The Command ORB Execution Task 245 retrieves the command it is to execute from the command message control (CMC) block that was placed in a CMC queue by the Application Task 275. The Command ORB Execution Task 245 schedules the Transaction Interface 210 to send or retrieve the data or status as directed. Once complete, the Transaction Interface 210 wakes up the Command ORB Execution Task 245, which then notifies the particular Application Task 275 for which it is working, of the status of the ORB execution or provides the requested data.

The Fetch Management Task 215 processes two special write requests. In either case, the Fetch Management Task 215 updates a field in an OMC block.

Finally, the Unsolicited Status Task 265 operates to send a status signal to initiators at another node, even if not requested. This task would operate to notify the initiators that were logged in before resetting the node, for instance.

An important feature of the invention is that each of the tasks described above operates according to a predetermined series of instructions. The tasks, depending on their complexity, may include one or a multitude of logic states. Each state represents a temporary stopping place for the task. Each task can be thought of as a sequential circuit whose behavior is determined from the current data (contained in its MCB) and the present state of the task. Depending on new data received after entering a state, a task that is in one state will change to a different state. It is also possible for the state, after receiving the new data, to remain in its present state until even more data is acquired by the task.

The operation of a sequential circuit, such as the tasks described above, can be described using a state table or a state diagram. A state table lists the present state of a sequential circuit and the conditions for it to proceed to a next state. Unless the conditions are met, the sequential circuit does not change states. An example of a state table is shown in FIGS. 15A–15E, which show the states for the Management Agent Task 225, as described below. Similarly, the different states of a sequential circuit can be shown in a state diagram, for example FIG. 11 that shows the different states of the Command ORB Execution Task 245. In these state diagrams, generally, stable states are shown as circles and conditions to change from one state to another are shown as arrows. Also, some indication is typically used to denote the initial state of the sequential machine. In this case, initial states are indicated by a double circle.

Figure 11:
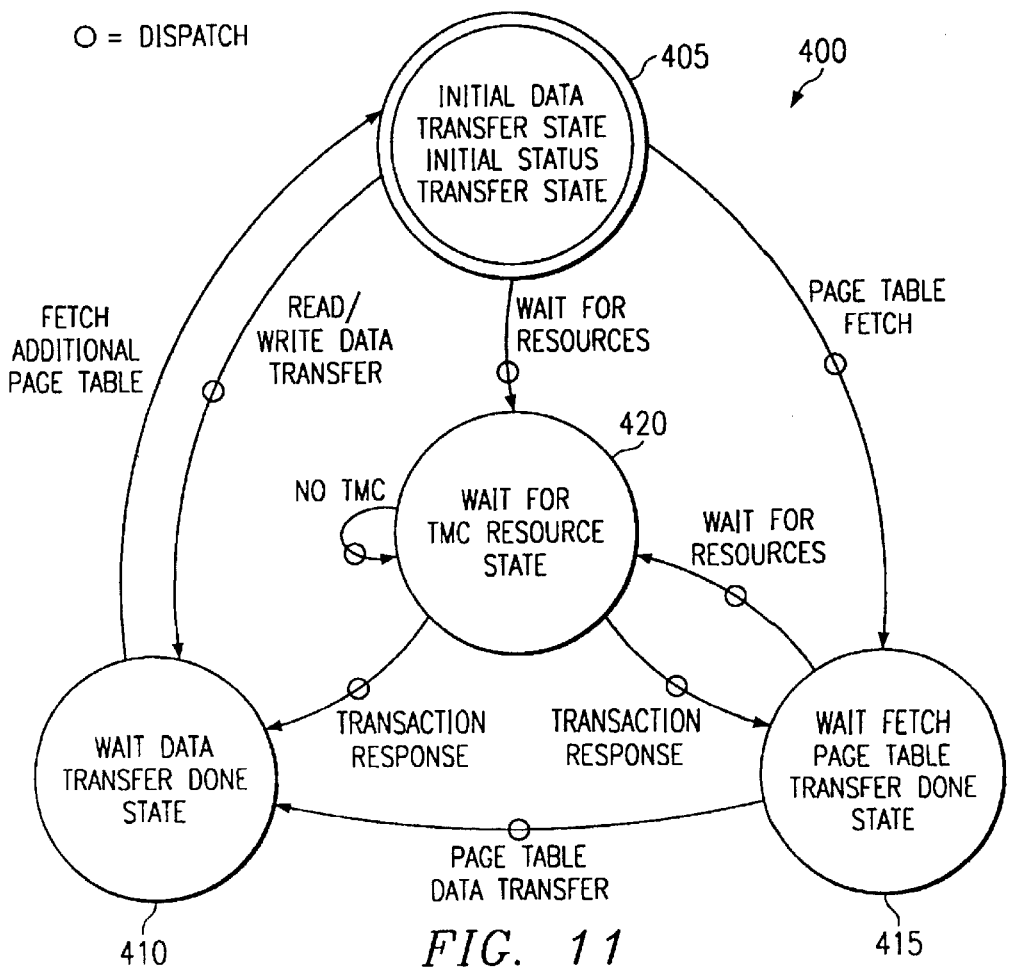
FIG. 11 is a state diagram showing the states of the Command ORB Execution task.

FIG. 11 shows the state diagram 400 for the Command ORB Execution Task 245, introduced in FIG. 3. As described above, circles on the diagram indicate steady states, and arrows show conditions needed to change states. Also as described above, the initial state is shown as a double circle. For the Command ORB Execution Task 245, the initial data state is referenced as 405.

As described above, the Command ORB Execution Task 245 generally operates on data and status transactions between the Application Task 275 and an initiator, normally located at a different node of the 1394 bus. As previously described, the Command ORB Execution Task 245 is called by the Application Task 275 by formatting a CMC block and queuing it into the Command ORB Execution Task's queue. When that particular CMC block is at the head of the queue, the Command ORB Execution Task 245 enters the initial state 405. This is both the initial data transfer state and the initial status transfer state, as shown in FIG. 11.

The first determination the Command ORB Execution Task 245 must make is whether the CMC block contains a data transfer or a status transfer operation. This information is contained in the CMC block and is simply decoded by the Command ORB Execution Task 245. If the Command ORB Execution Task 245 has been called for a data transfer, more information must be analyzed from the CMC block to determine which state to next go to. If the data in the CMC block indicates that a page table fetch is required, the Command ORB Execution Task 245 will perform a page table fetch and then change to a state 415. If, however, no page table fetch is necessary, the command ORB execution task begins transferring data, and will directly proceed to a state 410. A page table fetch is required if memory resources are fragmented or not available in large blocks, as is known in the art. A page table fetch is accomplished by the Command ORB Execution Task 245 requesting a TMC block, filling it with data necessary to perform a read block request and then queuing the TMC block into the queue for the Transaction Interface 210. It is necessary to perform a read block request because the Command ORB Execution Task 245 must request data, in the form of a block, from the initiator. This block will contain the page table data necessary to perform the data transfer of the Command ORB Execution Task 245. A circle noted on the arrow between two states, for example between states 405 and 415, indicates that an appropriate MCB must be prepared and one of the other tasks or services is called through the Dispatcher 220. If TMC resources are not available, i.e., all of the memory space for memory resources has been allocated by the Kernel 220, the Command ORB Execution Task 245 enters a state 420, where it waits for the appropriate resources. In most of the states, the task is suspended from further operation until additional or different data is provided to the task.

A suspended state means that the MCB currently at the top of the queue for the suspended task remains at the top of the queue. The suspended task will stay suspended until wakened up by the Kernel 220 or until the task times out. While in the suspended state, the suspended task starts a count-down timer. After a given period of time, the timer is decremented until the timer reaches zero. Once the count-down timer has reached zero, an error condition is generated. This error is reported to the task that called the task that timed out and may be stored in an error log, as is known in the art. If the error is not catastrophic, the task that timed out will remove the MCB currently at the top of its queue, and begin operation on the next highest MCB.

Turning back to FIG. 11, once the page table has been fetched in the state 415, the Kernel 220 will wake up the Command ORB Execution Task 245. This is done by scheduling the task to become operative, then the Kernel 220 calling the task. The Command ORB Execution Task 245 remembers the state it was in when it was suspended. Once the page table is fetched, the Command ORB Execution Task 245 requests the desired block of data from the location indicated in the page table. This step is shown as the arrow between the states 415 and 410. As above, this operation includes requesting a TMC block, filling the TMC block with data, and queuing the TMC block into the appropriate queue for the Transaction Interface 210. Also as above, because this utilizes the Dispatcher 220, the arrow between the states 415 and 410 contains a circle. If no memory resources are available for the TMC block, the Command ORB Execution Task 245 enters the state 420 where it waits for such resources.

The Command ORB Execution Task 245 enters the state 410 after a data transfer following a page table fetch, if entering the state 410 from the state 415, or after performing a read/write data transfer, if entering state 410 from the state 405. While in the state 410, the command ORB execution task determines if it has any additional data to transfer. There will be additional data to transfer if the size of the data requested to be transferred by the Application Task 275 is larger than the largest data block that can be attached to an asynchronous data packet, as described above. From the state 410, the Command ORB Execution Task 245 can return to the calling task, or, if it is determined that another page table fetch is necessary, proceed back to the initial state 405 to begin the process again. If another page table fetch is necessary, the state 415 is entered through state 405, as described above. Once the Command ORB Execution Task 245 completes its data transfer, the task returns to the calling task from state 410.

The Command ORB Execution Task 245 can also be responsible for sending a status transfer. If a status transfer is requested, a TMC block is requested and filled with the appropriate data. The TMC block is then queued in the queue for the Transaction Interface 210. If no conformation that the status transfer is requested by the calling task, the Command ORB Execution Task 245 has completed the function and returns to the calling task. If, instead, a conformation of the status transfer was requested by the calling task, the Command ORB Execution Task 245 proceeds to the state 410 to wait for the confirmation. Once conformation comes back from the Transaction Interface 210, the Command ORB Execution Task 245 returns to the calling task. As above, if memory resources are not currently available to allocate a TMC block, the Command ORB Execution Task proceeds to state 420 where it waits for such resources. Once available, the status is then sent through the Transaction Interface to the desired node on the 1394 bus.

By having each task operating as a state machine with a number of states, including several suspended states for some of the tasks, the Transport Protocol Interface 200 can perform multiple tasks at once, i.e., multitask. While a portion of a particular function is held in a suspended state, typically because data is needed from another node on the 1394 bus, other portions of the current function or even another function altogether can be operated on by one of the other tasks. This way, more than one function can be performed at the same time by the Transport Protocol Interface 200. Additionally, by having suspended states, the Kernel 220 is free to perform other tasks, which makes for improved system performance. Because the tasks are driven by state machines, processor time is optimized in fairly distributed among the tasks.

Figure 12:
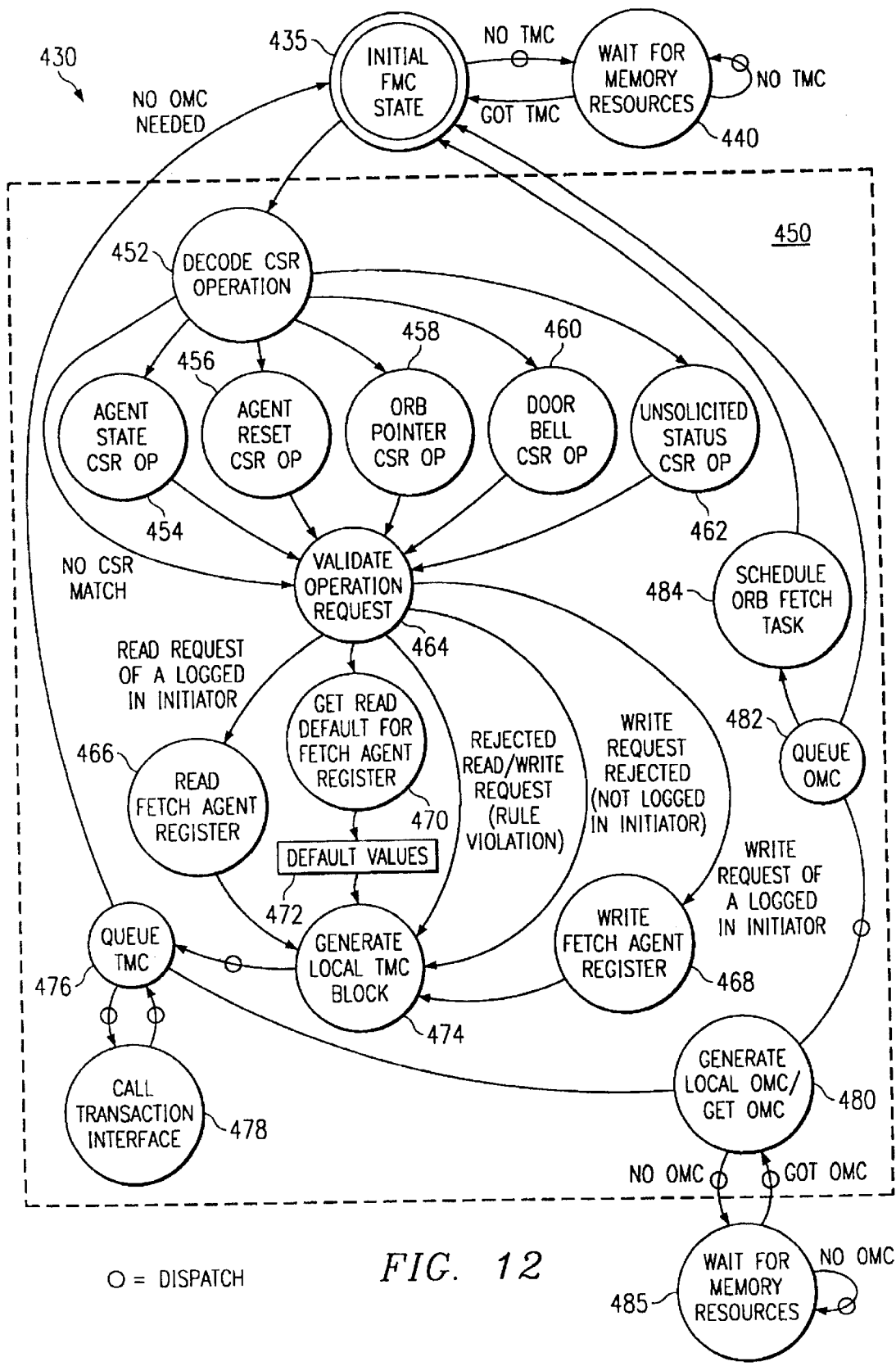
FIG. 12 is a diagram showing the states and execution flow of the Fetch Management task.

FIG. 12 shows a state diagram 430 for the Fetch Management Task 215. Additionally shown in FIG. 12 is an execution flow 450 for the Fetch Management Task 215, as described herein. The Fetch Management Task 215 is called by the Serial Bus Management Task 235 if one of the registers are to be accessed, as discussed below. Additionally, the Management Agent Task 225 calls the Fetch Management Task 215 for abort and reset conditions. Finally, the Transaction Interface 210 is able to call the Fetch Management Task 215 if directed by a separate node on the 1394 bus.

The initial state in the state diagram 430 is a state 435. Because it is sure that the Fetch Management Task 215 will eventually call the Transaction Interface 210, a TMC block is immediately requested from the Kernel 220 before other operations in the Fetch Management Task 215 are performed. If memory resources are not available, the Fetch Management Task 215 enters state 440 to wait for such resources. Once the resources are available for the TMC block, the Fetch Management Task 215 enters the execution flow 450, delineated by a doted outline. Within the execution flow 450 events as they occur within the Fetch Management Task 215 are indicated. These events are not states of a state machine per se, but rather indications showing the program flow of the Fetch Management Task 215. Initially, a step 452 is where the Fetch Management Task 215 decodes a CSR operation that is taken from the FMC block. As described above, the FMC block that the Fetch Management Task 215 is currently working on was queued in the associated queue for the Fetch Management Task.

Once the CSR operation is decoded in the step 452, the Fetch Management Task 215 determines which CSR is being accessed, based on its memory location. The CSR operation can access one of a number of registers, for example, it can be a CSR operation for the agent state CSR 454 the agent reset CSR 456, the ORB pointer CSR, 458, the doorbell CSR, 460 or the unsolicited status CSR 462. It is also possible that the CSR will not match a particular memory location as shown by the arrow going directly from step 452 to a step 464. In that step, the operation request, for example a read or write request, is validated to determine whether the initiator of the request has logged into the host. If the operation is a read request of a logged-in initiator, the fetch agent register is read in a step 466. If the operation request is a write request from a logged-in initiator, the fetch agent register is written in a step 468. If the operation is a valid read request however the host is not logged-in, a read default will be provided to the requester, including the default values as depicted in box 472. These default values are prescribed by a particular transport protocol being used, for instance in the SBP-2 transport protocol the default values for a valid read request from a requester that is not logged-in will be all zeros. If, at step 464, the read write request is rejected due to a rule violation, for example, an initiator is attempting to write into a read only memory location or read from a write only memory location, the execution flow 450 of the Fetch Management Task 215 goes to an operation 474, described below. Additionally, if an initiator that is not logged-in attempts to perform a write request, the Fetch Management Task 215 will reject that request and move the execution flow directly from the step 464 to 474. Once in step 474, the read or write agent registers, or the error message if the read or write request was rejected, will be packaged into the TMC block that was requested initially by the state 435. That TMC block is then placed in the queue of the Transaction Interface 210 at a step 476.

As before, if the Fetch Management Task 215 receives notification that the TMC block it just queued is at the head of the queue for the Transaction Interface 210, that means the Transaction Interface is not currently running. Therefore, if the Transaction Interface 210 is not currently running, the Transaction Interface is scheduled through the Kernel 220 at a step 478. From the step 476, after the TMC block has been queued into the TMC queue, a determination is made as to whether or not the fetch engine from the ORB Fetch Task 255 must be started or restarted. If no action is needed regarding the ORB Fetch Task 255, the Fetch Management Task 215 returns from the step 476 of the execution flow 450 directly back to the initial FMC state 435. If, however, the ORB Fetch Task 255 must be started or restarted, an OMC block must be generated as indicated in step 480. As before, if no memory resources are available to create the OMC block, the Fetch Management Task 215 enters a state 485 where it can wait for the proper memory resources. Once the Fetch Management Task 215 has the proper memory resources, the OMC block is queued at a step 482. As usual, if the Fetch Management Task 215 receives notification that the ORB Fetch Task 255 is not already running, the ORB Fetch Task is scheduled in a step 484. When, the Fetch Management Task 215 returns from its execution flow 450 back into the initial FMC state 435, it checks its own queue to determine whether to continue running or not. If there are no entries in the queue for the Fetch Management Task 215, the Fetch Management Task will shut down. If, however, there are additional entries in the queue for the Fetch Management Task 215, the next entry is decoded and the process for the Fetch Management Task 215 begins again in the initial FMC state 435.

Figure 13:
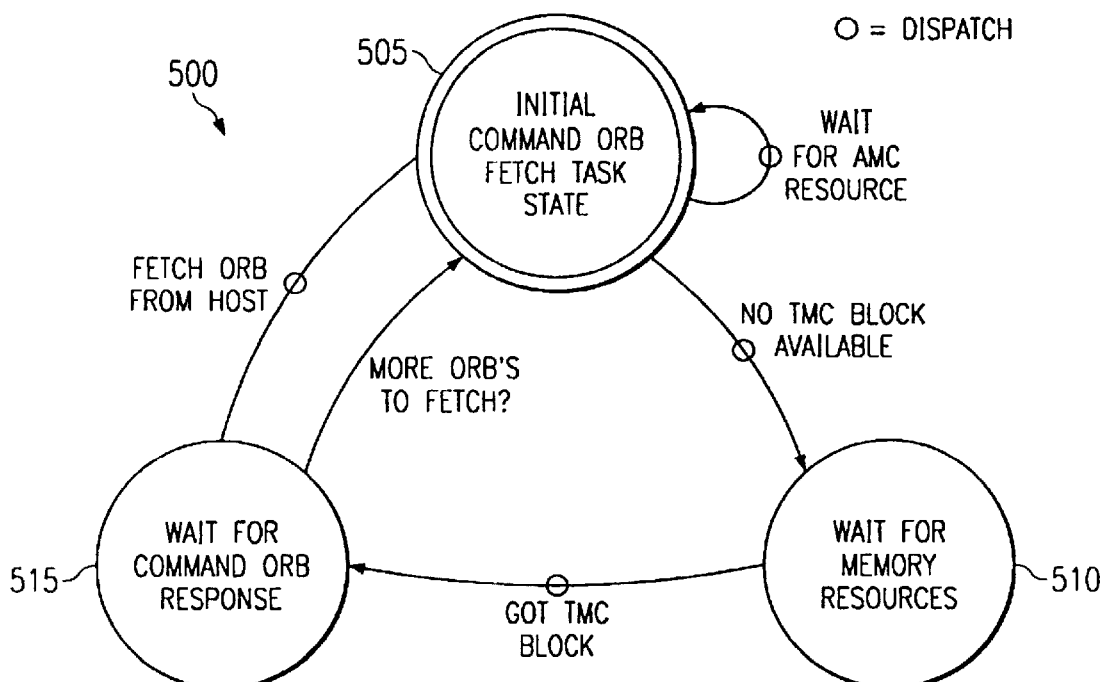
FIG. 13 is a state diagram showing the states of the ORB Fetch Task.

FIG. 13 shows a state diagram 500 for the ORB Fetch Task 255. As described above, the ORB fetch task 255 retrieves multiple command ORBs from one initiator at a time, and passes the encapsulated commands to the particular Logic Unit Number (LUN) operating within the Application Task 275. The ORB Fetch Task 255 begins in an initial state 505. Its first action is to determine the AMC block address requesting the command ORB fetch. If no AMC resources are available, it must wait for them to become available before operation begins. Once the block address is known, a TMC block is created asking for the command ORB to be retrieved from the initiator. As above, if no TMC resources are available, the ORB Fetch Task 255 moves to a state 510 to wait for those resources. Once the resources are available, the ORB Fetch Task 255 proceeds to a state 515 where it waits for a command ORB response. In the state 515, if the command ORB response is successful, and no further command ORBs are sought to be retrieved, the ORB Fetch Task 255 can leave from this state 515. If however there are more ORBs to fetch, the ORB Fetch Task 255 proceeds back to the initial state 505 to fetch more ORBs and the process continues.

The queue for the ORB Fetch Task 255 is unique in that it is circular. To allow for fairness arbitration, so that no one LUN within the application task monopolizes the resources of the transport protocol interface 200, there is a maximum number of command ORBs that are allowed to be fetched at any one time. This number is programmable, and is typically set to a fairly small number, for example, three, so that no LUN ties up the system for itself to the exclusion of other LUNs. If an OMC block originally requests, for example, ten command ORBs, the ORB Fetch Task 255 would fetch three of the command ORBs in its initial operation. That OMC block, with seven outstanding command ORB requests would then be moved from the top of the queue to the bottom of the queue so that other OMC blocks may be operated on. In total, the OMC block that requested ten command ORBs would enter the initial state 505 of the ORB Fetch Task 255 a total of four times; in each of the first three times, three command ORBs would be fetched, and the fourth time only one command ORB would be fetched. Once fetched, the ORB Fetch Task 255 will be in state 515. As described above, if there are no further command ORBs to fetch, the ORB Fetch Task 255 returns to its calling task directly from the state 515.

Figure 14:
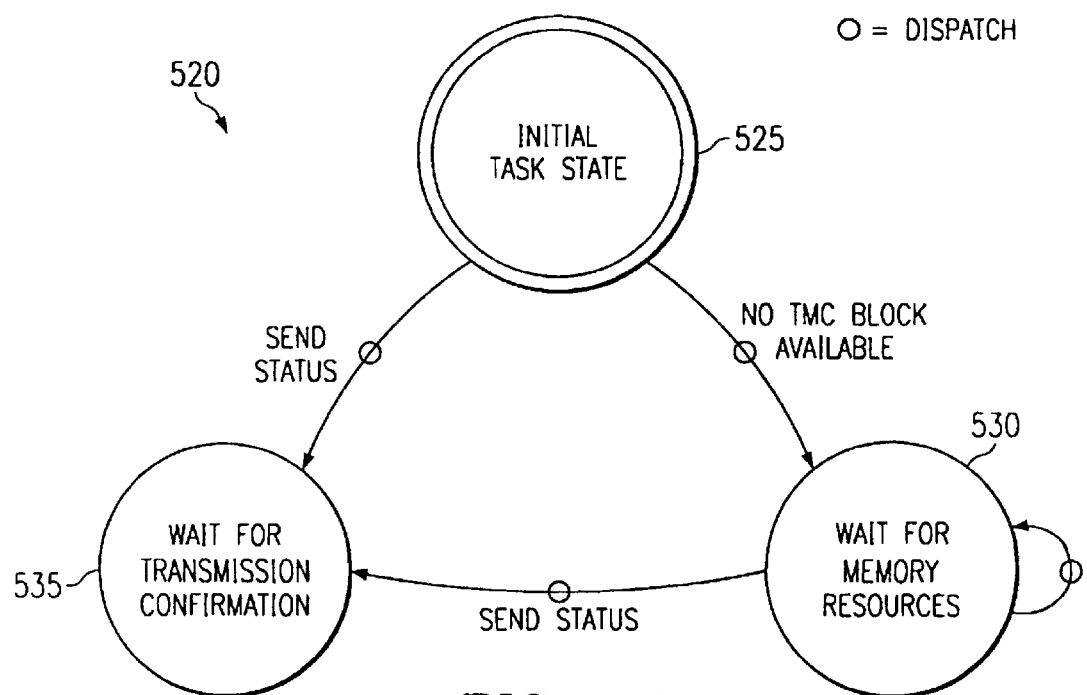
FIG. 14 is a state diagram showing the states of the Unsolicited Status Task.

FIG. 14 shows a state diagram for the Unsolicited Status Task 265. As described above, this task sends a notification to initiators that the application, or the node itself upon which the Transport Protocol Interface 200 sits, is being shut down. A state diagram 520 shows that the Unsolicited Status Task 265 has an initial state at 525. The operation of the Unsolicited Status Task 265 is to write data into memory of a host. Therefore, a TMC block must be generated including this data to be sent along the 1394 bus to the host's memory. As usual, if no memory resources are available to generate a TMC block, the Unsolicited Status Task 265 proceeds to a state 530 where it waits for memory resources. Once the TMC block is available, the status is sent and the Unsolicited Status Task 265 enters a state 535 where it waits for confirmation that the status was transmitted along the 1394 bus without error. Once the Unsolicited Status Task 265 is notified that the status task was sent without error, the Unsolicited Status Task exits from state 535 and returns to its calling task.

FIGS. 15A–15E show a state change decision table 550 for the Management Agent Task 225. The current state that the Management Agent Task 225 is in is shown on the left-hand side while the next state that the Management Agent Task 225 will be in is shown on the right-hand side of the decision table 550. States are separated from one another in the state change decision table 550 by a bold line. Near the top of the state change decision table 550 are conditions that must be met in order for the Management Agent Task 225 to change from its current state to the next state.

As described above, the Management Agent Task 225 handles management requests from an initiator, including access requests and task management requests. Generally, as depicted in FIG. 4, the MMC block contains a management ORB or a task ORB. The initiator that sent the management ORB or task ORB expects a response back saying that the Management Agent Task 225 has received the ORB. Therefore, the initial state of the Management Agent Task 225 is a "management agent write" state as shown in the state change decision table 550 of FIG. 15A. The management agent write state is the top-most state. Additionally, there is an x in the box under the condition "send ORB write response." The state change decision table 550 provides the information that if the Management Agent Task 225 is in the management agent write state and the condition send ORB write response is met, the next state will be "wait for ORB write response." In one embodiment of the Management Agent Task 225, the condition of send ORB write response is always set so that when the Management Agent Task 225 enters its initial state, it will always send an ORB write response.

As with the previous tasks, if there are no free memory resources, indicated on the state change decision table 550 as the condition "no free TMC block", the next state for the Management Agent Task 225 will be "wait for TMC resource." There are two other ways to leave the management agent write state. If there has been a split transaction timeout and there is another MMC block available, the Management Agent Task 225 will discard the current MMC block and go to the next MMC block in its queue. A split transaction timeout occurs when the Management Agent Task 225 does not receive notice that the data being written to the initiator was received by the initiator without error. Since, in this state, the Management Agent Task 225 was only sending a response indicating that it received the ORB, it is not necessary to take further action regarding this error, although it may be indicative that there are problems on the 1394 bus. The fourth way to exit the management agent write state of the Management Agent Task 225 is if there is a split transaction timeout but no further MMC blocks are available in the queue. When these conditions are satisfied, the Management Agent Task can do nothing more, and returns to the Kernel 220.

The next state shown on the state change decision table 550 is "wait for ORB write response." If the Management Agent Task 225 is in this state and the condition is satisfied to "fetch a management ORB from a host", the next state entered is "wait for ORB fetch", described below. As above, if no free TMC block is available, the next state will be wait for TMC resource. Also similarly to above, if the condition "transaction completed with error" is satisfied and there are more MMC blocks available in the queue for the Management Agent Task 225, the Management Agent Task discards its current block and begins operating on the next one. The condition "transaction complete with error" would occur, for instance, if the Management Agent Task 225 tried to send a request for an ORB but failed. The last way to exit from the wait for ORB write response state is if the transaction completed with an error but there are no more MMC blocks available, in which case the Management Agent Task returns to the Kernel 220.

As seen from the state change decision table 550, there are similarities in the "next state" for a number of the states. Because they have been adequately described above, for the interest of brevity the transitions to the "wait for TMC resource", "management agent write" and "(done)" states will not be again described for the remainder of the states of the Management Agent Task 225, but rather referred to as the standard state transitions.

The third state shown in the state change decision table 550 on FIG. 15A is the "wait for ORB fetch" state. This state will be entered by the Management Agent Task 225 once it has requested an ORB fetch from the ORB Fetch Task 255. The standard state transitions apply, with the exception of wait for TMC resource. The state "wait for ORB fetch" in the state change decision table 550 covers most of FIG. 15A, all of FIG. 15B and most of FIG. 15C. This state, however, is broken into a number of functions that are possible to be decoded from the ORB upon its return from the host. Once the ORB returns from the host, the Management Agent Task 225 sends a status back to the host indicating that the Management Agent Task has received the ORB. After the Management Agent Task 225 decodes the ORB it is analyzed to see if it contains a function, and if so, which function. If it contains the "login" function and the condition indicates that "an EUI-64 is to be read from the host", the next state the Management Agent Task 225 enters is "wait for login EUI." The EUI-64 is a login identifier that the host maintains. The standard state transitions apply to the login function of the wait for ORB fetch state.

If the function decoded from the ORB is "query-logins", a response is sent back to the host, and the next state is "query logins response sent." As always, if there is no free TMC block, the next state is wait for TMC resource.

If the function decoded from the ORB is "set password" and the condition "read password request" is set, this indicates that the host desires to change a password, so that the Management Agent Task 225 proceeds to the "wait for set password" state. If the ORB function completed, but had an error, for instance, the password was in the wrong format, the management agent task will move to the next available MMC block, if any. The same result happens if the ORB function completed without an error.

The last function shown in FIG. 15A is "logout." A simple response is all that needs to be sent for this function. Therefore, there are no other states that the Management Agent Task 225 can proceed to other than the standard states.

In FIG. 15B, the function "reconnect" is sent after the 1394 bus resets. For this function, the Management Agent Task 225 will reread the EUI-64 from the host. The standard state transitions also apply. The next function is "terminate." The Management Agent Task 225 merely sends a status back in response to this function and the standard state transitions apply. The next function is "abort task" and is related to the remaining functions shown in FIG. 15B: "abort task set" and "clear task set." Therefore, these functions will be reviewed together. When an abort command is received by the Management Agent Task 225 and decoded from the management ORB, a notice is sent by the Management Agent Task 225 to the Application Task 275 to remove the ORB from the application task. This does not require another state transition however, and is part of the execution flow of the Management Agent Task 225. With the functions abort task and abort task set, nothing further is done, and there are no next states aside from the standard next states. With the clear task set function, the Unsolicited Status Task 265 is invoked to send a message to the host. If there is no free UMC block, the next state of the Management Agent Task 225 is "wait for a CTS UMC block."

The next function, shown in FIG. 15C is a "logical unit reset." The Application Task 275 comprises more than one logical unit. Since the hosts must be told that the logical unit was reset, the Unsolicited Status Task 265 is utilized. If there are no free UMC blocks, the next state becomes the "wait for logical unit reset UMC block." The other states for the logical unit reset function are the standard states.

If the function decoded from the command ORB is a "target reset", all of the logical units for one specific target are reset. This is similar to the logical unit reset, but is broader in scope. The standard state transitions apply, with the addition of a state "wait for target reset UMC block", if no UMC blocks are available.

The next current state of the management agent task, shown in FIG. 15C is "wait for login EUI." This state was entered from the login function of the wait for ORB fetch state, shown in FIG. 15A. If the "login response sent" condition is met, the next state for the Management Agent Task 225 is "login response sent." If the condition exists to read a password request, the next state becomes "wait for login password." The remainder of the states are standard.

The next state shown in FIG. 15C is "login response sent." In this state, the Management Agent Task 225 sends an acknowledgement back to the host as a form of handshaking. Only the standard next states are used.

The last current state shown in FIG. 15C is "wait for login password." If the "login response sent" condition is met, the next state is the "login response sent" state, described immediately above. The remainder of the state transitions are the standard states.

The first state illustrated in FIG. 15D is the "query logins response sent" state. With this state, the Management Agent Task 225 simply sends a status back to the requester. Only the standard state transitions apply.

The remainder of the current states illustrated in FIG. 15D are all states where the Management Agent Task 225 is waiting for something to be returned. For the current states "wait for set password", "wait for reconnect EUI", and "wait for TMC resource", only the standard state transitions apply, and therefore nothing further need be explained. For the states "wait for CTS UMC", "wait for LUR UMC", and "wait for TR UMC", the only state transition in addition to the standard transitions is that of waiting for a UMC block, as described above.

The current state shown in FIG. 15E is "wait for TMC resource", carried over from FIG. 15D. In that state, if a transaction confirmation has been requested, the confirmation request is sent and the next state is the state immediately subsequent to the one that entered the "wait for TMC resource" state.

Figure 16:
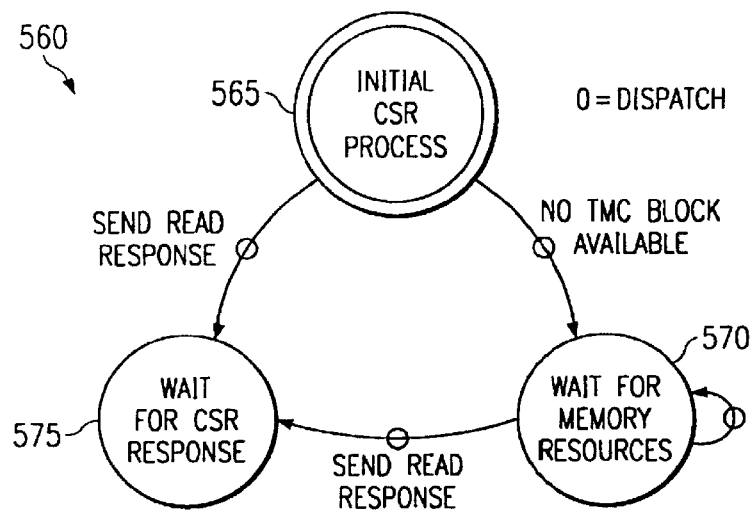
FIG. 16 is a state diagram showing the states of the Serial Bus Management Task.

Next, the Serial Bus Management Task 235 is explored. As described above, the Serial Bus Management Task 235 functions as an interface between the serial bus management 40 of FIG. 2 and the Application Task 275 on the same nodes. A state diagram 560 for the Serial Bus Management Task 235 is shown in FIG. 16. An initial state 565 begins the CSR process. The CSR process is invoked when a host tries to read a CSR register. The Serial Bus Management Task 235 sends a read response to the host including this data. As typical, the initial state 565 attempts to secure a TMC block. If no TMC block is available, a state 570 is entered until a TMC block is received. Once the TMC block is received and filled with the appropriate data, a state 575 is entered. This state can also be entered directly by the initial state 565 provided a TMC block was originally available. In the state 575, the Serial Bus Management Task 235 waits for the appropriate response from the Transaction Interface 210, indicating that the CSR read response was received by the host. Once the Serial Bus Management Task 235 receives an indication that the CSR read response has been received, it returns to its calling task, directly from the state 575.

Figure 17:
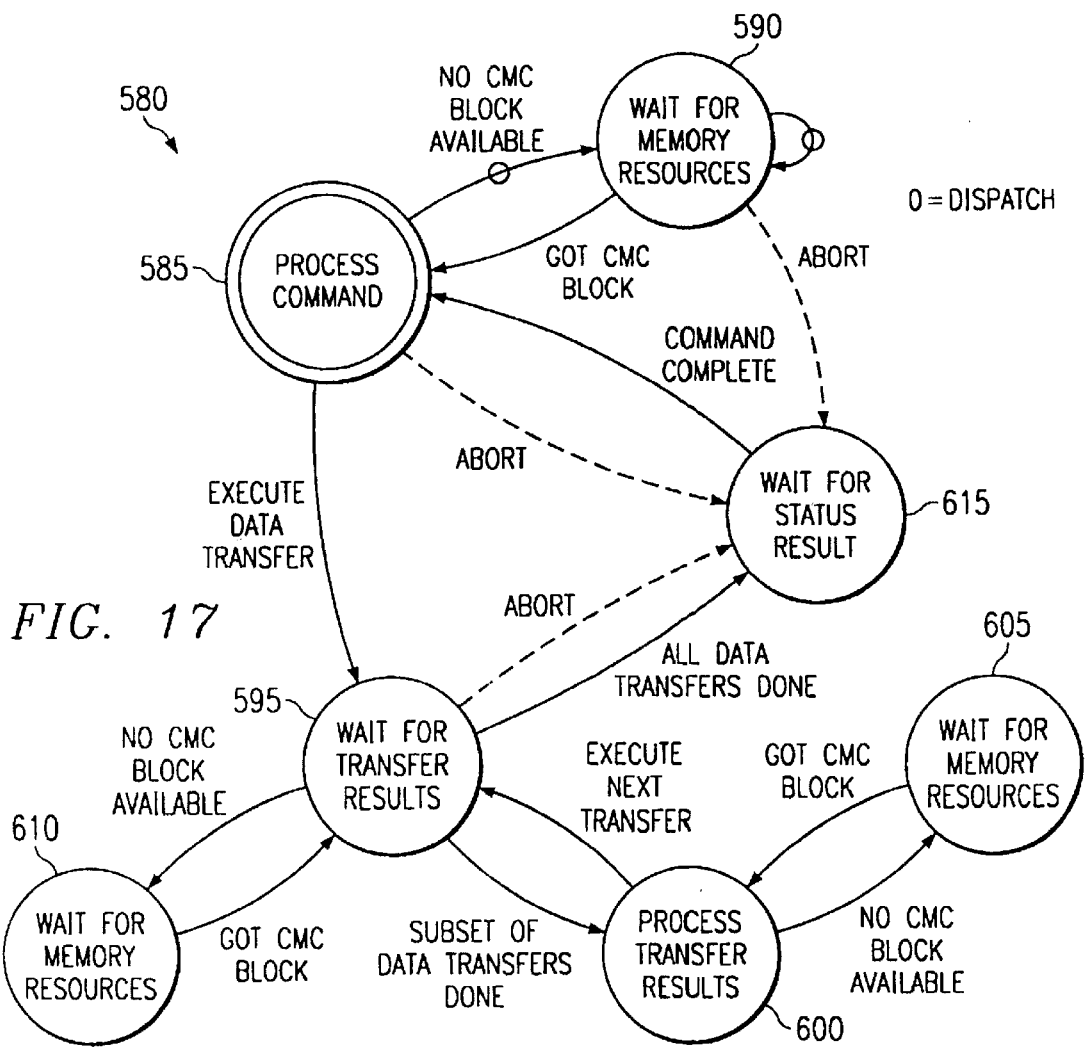
FIG. 17 is a state diagram showing the states of the Application Task.

FIG. 17 shows a state diagram 580 of the Application Task 275. Within the Application Task 275, the state diagram 580 is repeated for every LUN contained within the Application Task 275. As described above, the Application Task 275 receives high level commands, and executes them. The Application Task 275 uses the Command ORB Execution Task 245 to send data and status transfers to other nodes on the 1394 bus.

An initial state of the state diagram 580 is a state 585. In that state, a command that was delivered by the ORB Fetch Task 255 is processed. If the command is a valid command, the data is sent to the initiator through the Command ORB Execution Task 245. This requires a CMC block. If no memory resources are available, the Application Task 275 proceeds to a state 590 where it waits for memory resources. Once the CMC block is available, the data is transferred and the Application Task 275 proceeds to a state 595, where it waits for status of the data transfer. Once each subset of the data transfer is complete, the Application Task 275 changes to a state 600, where the transfer results are processed. If further data transfers are necessary, they are sent via the Command ORB Execution Task 245, for which the requisite CMC block must be obtained. If no memory resources are available, the Application Task 275 moves to a state 605 until they are available. Then the next transfer is executed and the Application Task 275 returns to the state 595 to wait for the transfer results. Once all of the data transfers are complete, a status is sent to the initiator from the state 595. As this step also requires creation of a CMC memory block, if none are available, the Application Task 275 changes to a state 610 until a CMC block is available. Once the status has been sent, a state 615 is entered where a status result is awaited. If an error results, the Application Task 275 ceases operation, but if the result is satisfactory, the command is completed and the initial state 585 is entered once more, to operate on another AMC block at the top of the queue for the Application Task 275.

Shown via dotted lines from the states 585, 590, and 595 are indications of what the Application Task 275 will do when directed to abort by the Management Agent Task 225. When the Management Agent Task calls the abort function of the Application Task 275, the Application Task immediately proceeds to the state 615 where it awaits the status result. The Application Task 275 will abort from this state.

An example of the 1394 bus architecture in operation provides further understanding of the interoperation of the services and tasks. An example utilizing several of the tasks is an act of logging into the host via a management login ORB. This would occur, for example, when a printer is plugged into the 1394 bus. With reference to FIG. 3, the login begins with an initiator on a non-local node. The initiator sends one or more data packets to the Transaction Interface 210 on the local node, where it is received and decoded by the hardware receiving bay. The Transaction Interface 210 decodes a transaction code from the packet and decodes it to see that the initiating task requests data to be written at a destination address found on the local node (logging in to the host). This particular operation is a write management agent operation and first uses the Management Agent Task 225.

The Transaction Interface 210 requests a free MMC block from the Kernel 220, initializes the MMC block with data read from the received data packet, and queues it into the Management Agent Task 225 working queue. If a return code sent back to the Transaction Interface 210 shows that this MMC block is currently at the top of the queue, the Management Agent Task 225 is not currently operating and must be started. The Transaction Interface 210 builds a DMC block and calls the Dispatcher 220 to start the Management Agent Task 225. The Dispatcher 220 then notifies the Management Agent Task 225 that it has an entry in its queue. The Management Agent Task 225 decodes the MMC block in its queue and the operation contained within. The operation that was decoded tells the Management Agent Task 225 that it must read the management ORB from the host. This includes transmitting from the Transaction Interface 210. A TMC block is created, initialized with the management ORB address and other parameters and queued in one of the TMC queues. The Management Agent Task 225 updates a task state in the MMC block stating that it is waiting for a management ORB fetch. If a return code indicates the TMC block is at the top of the queue, the Transaction Interface 210 must be started through the Dispatcher 220. After it begins execution, the Transaction Interface 210 decodes the TMC block to see it must schedule a transmission. It is scheduled and executes.

The Transaction Interface 210 receives the management ORB from the initiator. The Transaction Interface 210 then calls the Management Agent Task 225 with the login command. The Management Agent Task 225 attempts to login for the initiator. If all login criteria are met, the Management Agent Task 225 requests a new OMC block. The OMC block is then initialized with pertinent data, and a login response is built. The login response is scheduled with the Transaction Interface 210 by queuing a TMC block to one of the TMC queues, telling the initiator that the login was successful. Later, a status block is sent back to the initiator by queuing a TMC block into one the TMC queues. After the status block is sent, the original MMC block is deallocated, returned to the free memory block pool, and the Management Agent Task 225 operates on the next highest MMC block in its queue. As one skilled in the art will appreciate, any function for any protocol used as the transport layer 80 can be formed into tasks that the Transaction Interface 210 can call.

As a further example, FIG. 10 shows an embodiment of the invention that is using Function Control Protocol as its transport layer 80. Notice that the Transaction Hardware 205, Transaction Interface 210, and Kernel 220 have the same function as the embodiment shown in FIG. 3. Further, the Serial Bus Management Task 235 and Application Task 275 are also similar to the embodiment shown in FIG. 3. However, some tasks such as the Application/FCP Command Execution Task 295 will be created specifically for the protocol used, in this case FCP. The CSR Management Task 285 is an alternative method to include the CSR services, required to implement a 1394 bus. In the embodiment shown in FIG. 3, these services are handled by the Serial Bus Management Task 235.

Figure 18:
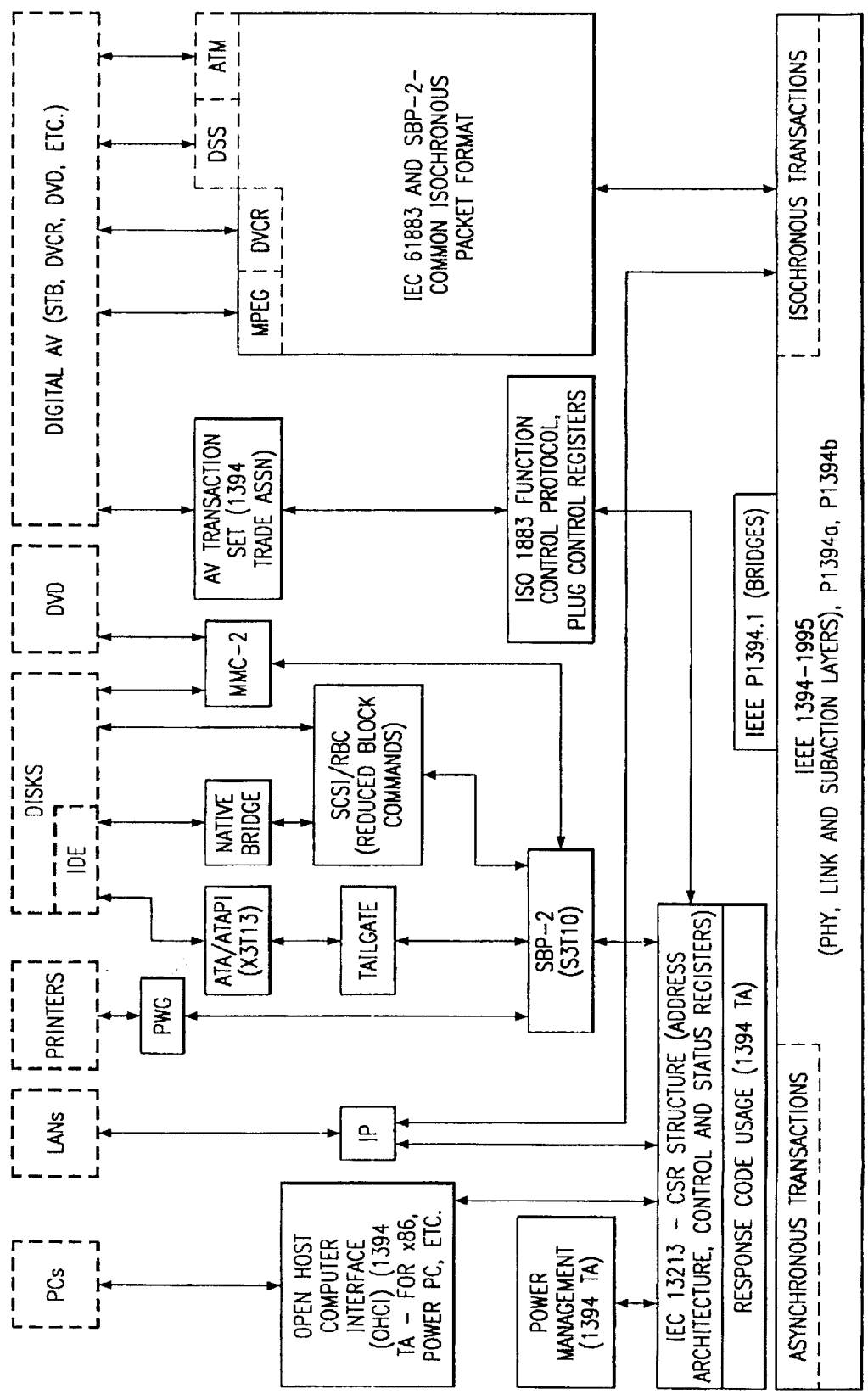
FIG. 18 is a chart showing applications and protocols that can be used with a 1394 bus.

Some of the possible applications and protocols for use with a 1394 bus are shown in FIG. 18. The 1394 bus, using the Communications Controller 200 as described herein, allows almost any type of peripheral device to be connected to one another. In FIG. 18, the 1394 bus is represented at the bottom of the figure and shows that it contains both asynchronous and isochronous capabilities. The next layer above the 1394 bus shows examples of the transport layer 80 shown in FIG. 2. Shown are SBP-2, FCP and SBP-2 common isochronous packet format. The next layer above the transport layer 80 shows examples of the application layer 90, as shown in FIG. 2. Shown are upper level protocols, such as MMC-2 used for hard disk drives and digital video disk drives, PWG, a protocol for use with printers, RBC, another protocol often used with hard disk drives, and an AV transaction set, used for consumer electronic devices. Next, shown above the application layer 90, are the devices that use the protocols listed underneath them, including printers, hard disc drives, DVD players, etc. Of course, other peripheral devices can use the 1394 bus to their advantage other than those listed here, and with different application or transport protocols. As stated above, this expands the compatibility of the 1394 bus with other buses.

From the foregoing it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. A transport protocol interface system for a serial bus, the system comprising:
    a transaction interface for coordinating communications to and from the bus, comprising:
        a first queue structured to accept one or more message control blocks, each message control block containing organized data and to accept one or more data packets;
        a conversion engine structured to read the message control blocks and convert the organized data into data packets and to read the one or more data packets and convert the data packets into message control blocks;
        an input port structured to receive data packets from the bus, and an output port structured to pass data packets to the bus;
    the system further comprising at least one task structured to communicate with the transaction interface to receive and transmit message control blocks; and
    a service provider structured to communicate with the at least one task, the service provider configured to schedule task requests received from the at least one task and to allocate system resources including memory.

2. The system of claim 1 wherein the transaction interface comprises at least one transmit bay having a hardware register, and wherein data packets are written to the hardware register in the transmit bay.

3. The system of claim 2 wherein the transaction interface is structured so that, after the data packets are written to the hardware register, a trigger bit is set to indicate that there is data in the transmit bay.

4. The system of claim 1, wherein the transaction interface further comprises:
    a second queue structured to accept message control blocks having a higher priority than blocks accepted at the first queue;
    a third queue structured to accept message control blocks having a higher priority than blocks received at the second queue.

5. The system of claim 1, wherein the transaction interface further comprises a plurality of transmit bays and output ports, wherein each of the transmit bays are related to a respective one of the output ports, and wherein each output port is structured to, for each data packet, attempt to pass the data packet to its respective transmit bay, and if busy, repeatedly attempt to pass the data packet to another transmit bay until a transmit bay is located that is not busy.

6. The system of claim 5 wherein the total number of output ports and total number transmit bays in the transaction interface is three.

7. The system of claim 1 further comprising a DMA channel.

8. The system of claim 1 further comprising a payload data transmit bay.

9. The system of claim 8 wherein data comprising a lock response according to a 1394 protocol is sent by a node on the serial bus using both the transmit bay and the payload data transmit bay.

10. The system of claim 1, further including a receive hardware bay structured to receive data packets from the serial bus.

11. The system of claim 1 wherein the message control blocks received by the queue are Transaction Message Control blocks.

12. In a node on a serial bus, a transaction interface system comprising:
    a transaction interface, comprising:
        a queue structured to receive one or more message control blocks from at least one task component associated with the node, each message control block containing organized data;
        a set of logical processes structured to read the message control blocks and convert the organized data into data packets; and
        at least two output ports each related to a respective transmit bay, and each structured to pass the data packets to its respective transmit bay or to another transmit bay to be placed on the bus;
    the system further comprising a service kernal associated with the at least one task component and configured to schedule and dispatch tasks and services within the node called by the one or more message control blocks and to allocate memory resources.

13. The transaction interface system of claim 12 wherein the data packets are written to a transmit bay register.

14. The transaction interface system of claim 12, further comprising:
    a plurality of priority queues in the transaction interface and structured to accept message control blocks having a higher priority than the message control blocks accepted at the queue.

15. The transaction interface system of claim 12, wherein each of the transmit bays are related to a respective output port, and, before one of the output ports passes data packets to the transmit bay, the set of logical processes checks a data structure to determine which of the transmit bays of the transaction interface, if any, are free to have data written to it.

16. The transaction interface system of claim 15 wherein the set of logical processes checks the output port's respective transmit bay before checking any other transmit bays.

17. The transaction interface system of claim 12 wherein the total number of output ports and total number transmit bays in the transaction interface is three.

18. The transaction interface system of claim 12 wherein the hardware further comprises a DMA channel.

19. The transaction interface system of claim 12, further including a hardware receiving bay structured to receive data packets from the serial bus.

20. A method of transacting data to a serial bus comprising:
    accepting, at a queue, message control blocks from one or more task components including data destined to be sent to the bus;
    formatting the data to be sent into one or more packets;
    formatting other data contained within the message control block into packet headers for the packets;
    writing the packets and the packet headers to the serial bus via a hardware interface; and
    communicating to the hardware interface that the packets had been written and, when the hardware interface is busy, polling for other available hardware interfaces.

21. The method of claim 20 wherein writing the packets and the packet headers to a hardware interface and communicating to the serial interface comprises:
    at one of a plurality of output nodes, evaluating a data structure to determine if a respective one of a plurality of hardware registers are currently available;
    if the respective hardware register is available, write a data packet to the hardware register; and if the respective hardware register is not available, sequentially evaluate all of the hardware registers, in sequence, until a hardware register that does not have data in it is found.

22. The method of claim 20 wherein accepting message control blocks comprises receiving message control blocks at one of a plurality of queues, each queue designated as having a different priority for execution than the other queues.

23. The method of claim 20 wherein formatting the data to be sent into one or more packets comprises encapsulation data in blocks, the size of which are limited by a speed of the serial bus.

24. The method of claim 20 wherein the step of communication to the hardware interface comprises setting a trigger bit in the hardware interface.

* * * * *